United States Patent
Fukuda et al.

(10) Patent No.: US 7,882,526 B2
(45) Date of Patent: Feb. 1, 2011

(54) PROGRAM INFORMATION RETRIEVAL SYSTEM, BROADCAST RECEIVING APPARATUS, PROGRAM INFORMATION RETRIEVAL APPARATUS, PROGRAM INFORMATION RETRIEVAL METHOD, AND COMPUTER PROGRAM

(75) Inventors: Kazuhiro Fukuda, Kanagawa (JP); Tetsuo Maruyama, Tokyo (JP); Yasuaki Yamagishi, Kanagawa (JP)

(73) Assignee: Sony Corporation, Tokyo (JP)

(*) Notice: Subject to any disclaimer, the term of this patent is extended or adjusted under 35 U.S.C. 154(b) by 602 days.

(21) Appl. No.: 11/865,434

(22) Filed: Oct. 1, 2007

(65) Prior Publication Data
US 2008/0250455 A1 Oct. 9, 2008

(30) Foreign Application Priority Data
Oct. 3, 2006 (JP) .............. P2006-272027

(51) Int. Cl.
*G06F 13/00* (2006.01)
(52) U.S. Cl. .............. 725/50; 725/45; 725/46
(58) Field of Classification Search ........ 725/46, 725/50
See application file for complete search history.

(56) References Cited

U.S. PATENT DOCUMENTS

| | | | | |
|---|---|---|---|---|
| 5,559,548 | A * | 9/1996 | Davis et al. | 725/40 |
| 5,790,935 | A * | 8/1998 | Payton | 725/91 |
| 5,973,685 | A * | 10/1999 | Schaffa et al. | 715/722 |
| 2003/0020744 | A1* | 1/2003 | Ellis et al. | 345/723 |
| 2006/0095543 | A1* | 5/2006 | Ito et al. | 709/218 |

FOREIGN PATENT DOCUMENTS

JP 2005-173644 6/2005

\* cited by examiner

*Primary Examiner*—Scott Beliveau
*Assistant Examiner*—Nicholas T Corbo
(74) *Attorney, Agent, or Firm*—Oblon, Spivak, McClelland, Maier & Neustadt, L.L.P.

(57) ABSTRACT

A program information retrieval system in which a broadcast receiving terminal and a resolver server are connected through a communication network includes a local storing unit that stores a program information, a taste-information acquiring unit that acquires taste information of a user, a program-information requesting unit that requests the resolver server to provide program information, and a program-information receiving unit that receives the program information transmitted from the resolver server. The resolver server includes a master storing unit that stores the program information, a program-information-request receiving unit that receives a request for program information based on the taste information from the broadcast receiving terminal, a program-information extracting unit that extracts program information matching the taste information from the master storing unit using the identifier, and a transmitting unit that transmits the program information extracted from the master storing unit to the broadcast receiving terminal.

20 Claims, 25 Drawing Sheets

FIG. 5

```
<program g_crid=" crid://all-japan.com/provider.com/p0001" broadcast_station_program id="P12345678" name="PIRATES" >
  <details>
    <genre="movie"/>
    <keywords=" JACK ACTION ADVENTURE COMEDY SEQUEL BURN AT THE STAKE " />
    <CreditsList>
      <cast id="1_1" name=" KEIRA KIGHTLEY"  Birthplace="England"/>
      <cast id="1_2" name=" JOHN DEPP" />
      <cast id="1_3" name=" ORL BLOOM"/>
    </CreditsList>
  </details>
  <oa_list>
    <oa start_date="2006/10/1" start_time="20:00:00" duration="02:00:00" />
  </oa_list>
</program>
```

FIG. 9

```
<favourite_list date="2006/10/01:20:00:00">
    <genre="movie drama sports" />
    <keywords="KOREAN STYLE OVERSEAS TRAVEL BRAIN" />
    <cast="KEIRA KIGHTLEY JODY STER" />
</favourite_list>
```

FAVORITE LEVEL

FOR EXAMPLE, FAVORITE PROGRAMS AND META ITEMS (VALUES) IN THE PROGRAMS ARE SET AT THREE LEVELS

◎ : EXCELLENT
○ : FAIR
△ : VIEW WHEN NOT BUSY

FIG. 26

TODAY'S PROGRAM GUIDE

| | SPORTS | HOT SPRING | CARTOON | FAVORITE | RECOMMENDATION |
|---|---|---|---|---|---|
| MORNING | PROGRAM A (BROADCASTING STATION a) 6:00-7:00 SOCCER [X][Y][Z]<br><br>PROGRAM C (BROADCASTING STATION b) 6:00-7:00 BASEBALL [X][Y][Z] | | | | PROGRAM T (BROADCASTING STATION p) 6:00-7:00 NEWS (2) [X][Y][Z]<br><br>PROGRAM U (BROADCASTING STATION a) 7:00-8:00 INFORMATION [X][Y][Z] |
| DAYTIME | | PROGRAM B (BROADCASTING STATION i) 13:00-14:00 HOT SPRINGS IN VARIOUS PLACES [X][Y][Z] | PROGRAM J (BROADCASTING STATION e) 14:00-16:00 CARTOON MOVIE [X][Y][Z] | PROGRAM N (BROADCASTING STATION b) 13:00-14:00 TRAVEL (1) [X][Y][Z]<br><br>PROGRAM O (BROADCASTING STATION g) 15:00-16:00 DRAMA (1) [X][Y][Z]<br><br>PROGRAM P (BROADCASTING STATION h) 16:00-17:00 DRAMA (2) [X][Y][Z] | PROGRAM V (BROADCASTING STATION d) 13:00-14:00 MOVIE (2) [X][Y][Z] |
| NIGHT | PROGRAM D (BROADCASTING STATION c) 20:00-21:00 GOLF [X][Y][Z]<br><br>PROGRAM E (BROADCASTING STATION f) 19:00-21:00 SOCCER [X][Y][Z]<br><br>PROGRAM F (BROADCASTING STATION h) 19:00-22:00 BASEBALL [X][Y][Z] | PROGRAM G (BROADCASTING STATION a) 19:00-20:00 TOUR OF HOT SPRINGS [X][Y][Z]<br><br>PROGRAM H (BROADCASTING STATION j) 21:00-22:00 HOT SPRING (1) [X][Y][Z]<br><br>PROGRAM I (BROADCASTING STATION b) 21:00-21:30 HOT SPRING (2) [X][Y][Z] | PROGRAM K (BROADCASTING STATION k) 18:00-19:00 CARTOON (1) [X][Y][Z]<br><br>PROGRAM L (BROADCASTING STATION l) 19:00-19:30 CARTOON (2) [X][Y][Z]<br><br>PROGRAM M (BROADCASTING STATION c) 19:30-20:00 CARTOON (3) [X][Y][Z] | PROGRAM Q (BROADCASTING STATION m) 18:00-19:00 GOURMET [X][Y][Z]<br><br>PROGRAM R (BROADCASTING STATION n) 21:00-23:00 MOVIE (1) [X][Y][Z]<br><br>PROGRAM S (BROADCASTING STATION o) 23:00-23:30 NEWS (1) [X][Y][Z] | PROGRAM W (BROADCASTING STATION k) 18:00-19:00 SPORTS [X][Y][Z]<br><br>PROGRAM X (BROADCASTING STATION g) 19:00-20:00 VAUDEVILLE [X][Y][Z]<br><br>PROGRAM Y (BROADCASTING STATION m) 22:00-23:00 DRAMA (3) [X][Y][Z] |

PROGRAM INFORMATION RETRIEVAL SYSTEM, BROADCAST RECEIVING APPARATUS, PROGRAM INFORMATION RETRIEVAL APPARATUS, PROGRAM INFORMATION RETRIEVAL METHOD, AND COMPUTER PROGRAM

CROSS-REFERENCES TO RELATED APPLICATIONS

The present invention contains subject matter related to Japanese Patent Application JP 2006-272027 filed in the Japanese Patent Office on Oct. 3, 2006, the entire contents of which being incorporated herein by reference.

BACKGROUND OF THE INVENTION

1. Field of the Invention

The present invention relates to an information retrieval system, a broadcast receiving apparatus, a program information retrieval apparatus, a program information retrieval method, and a computer program.

2. Description of the Related Art

In general, program information of television programs is acquired through a television page of a newspaper and a television program guide. Recently, since the communication by means of the Internet is spread, program information can also be acquired through the Internet. For example, JP-A-2005-173644 discloses a system that is capable of acquiring content delivered through the Internet and allowing a user to acquire desired content.

SUMMARY OF THE INVENTION

In a broadcast receiving terminal used in a digital broadcast service, an event_id transmitted from a broadcasting station is used as an identifier of a program. Data such as an electronic program guide is received on the basis of the event_id. However, since the event_id is a reusable identifier, when the event_id is used as an identifier of a specific program and the broadcast of the program is finished, the event_id is used as an identifier of another program. Therefore, it is difficult to retrieve information on the program finished to be broadcasted using the event_id.

Therefore, even if a user attempts to continuously acquire information on a favorite program, it is difficult for the user to keep a program ID and program information as reusable data. In the case of a broadcast program of a broadcasting station, when the broadcast of the program is finished, program information and program schedule information on a network are deleted or storage locations for the information are changed to suit convenience of the broadcast station. As a result, it is difficult for the user to access the information. Therefore, because of program scheduling such as the finish of a broadcast, it is difficult to acquire information on the basis of the event_id. Moreover, even if the user attempts to acquire a program of the broadcast after the finish of the broadcast, since the event_id is reused as an identifier of another program, it is difficult to acquire information across various media planned to be broadcasted after that. Therefore, for example, even when DVDs and the like are sold after the finish of the program, it is difficult to acquire sales information on the basis of program information.

Moreover, since the event_id is an identifier unique to each broadcasting station, when different broadcasting stations use an identical event_id, it is difficult to acquire desired program information on the basis of the event_id. On the other hand, when it is attempted to provide information in addition to the electronic program guide, a great deal of labor is necessary because of limitations on standard and operation.

Recently, there are an extremely large number of programs including programs broadcasted by ground waves, satellite broadcast, CS broadcasts, and the like. A great deal of labor is necessary to retrieve a program matching a preference of the user from the number of programs. In retrieval through the Internet, under the present situation, program information is provided for each broadcasting station. When the user retrieves information for each broadcasting station, a great deal of time and labor is necessary to retrieve program information matching a preference of the user. When a general retrieval system through the Internet is used, information not demanded by the user such as unsolicited contents is presented. Since the user needs to sort the information, a great deal of labor is necessary.

Furthermore, when the user attempts to perform not only the retrieval of a program but also acquisition of information such as information incidental to the program such as a cast of a drama, a theme song, CM information, related goods (DVDs and character merchandise), a greater deal of labor is necessary. Therefore, it is difficult for the user to keep information matching a taste of the user in a form intended by the user.

When it is attempted to transmit all pieces of program information from a specific apparatus (server), accesses from a large number of broadcast receiving terminals concentrate on the apparatus and a load on the apparatus increases. Therefore, problems such as the fall in processing speed are anticipated.

Therefore, it is desirable to provide a new and improved information retrieval system, broadcast receiving apparatus, program information retrieval apparatus, program information retrieval method, and computer program that are capable of separately acquiring pieces of program information according to taste information of a user.

According to an embodiment of the present invention, there is provided a program information retrieval system in which a broadcast receiving terminal that receives a broadcast program and a resolver server that provides program information attached with an identifier peculiar to each broadcast program are connected through a communication network. The broadcast receiving terminal includes a local storing unit that stores the program information, a taste-information acquiring unit that acquires taste information of a user, a program-information requesting unit that requests, on the basis of the taste information, the resolver server to provide program information, and a program-information receiving unit that receives the program information transmitted from the resolver server. The resolver server includes a master storing unit that stores the program information, a program-information-request receiving unit that receives a request for program information based on the taste information from the broadcast receiving terminal, a program-information extracting unit that extracts program information matching the taste information from the master storing unit using the identifier, and a transmitting unit that transmits the program information extracted from the master storing unit to the broadcast receiving terminal.

According to the embodiment, the broadcast receiving terminal requests, on the basis of taste information of a user, the resolver server to provide program information, receives the program information transmitted from the resolver server, and stores the program information in the local storing unit. The resolver server receives a request for program information based on the taste information from the broadcast receiving terminal and extracts program information matching the taste information from the master storing unit using the identifier. The extracted program information is transmitted to the broadcast receiving terminal and stored in the local storing unit. The identifier peculiar to each broadcast program is attached to the program information. Since the broadcast receiving terminal can access program information corresponding to the taste information stored in the local storing unit, the broadcast receiving terminal can instantaneously retrieve favorite program information of the user. Program information matching tastes of users is stored in a large number of broadcast receiving terminals connected to the resolver server. Thus, it is possible to prevent accesses from the large number of broadcast receiving terminals to the resolver server from concentrating.

Preferably, the program information retrieval system further includes a program-information creating apparatus that gives the identifier by associating metadata and location information of the broadcast program with the identifier and creates the program information and the resolver server receives the program information from the program-information creating apparatus. Consequently, the resolver server can provide the program information attached with the identifier by associating the metadata and the location information of the broadcast program with the identifier.

According to another embodiment of the present invention, there is provided a broadcast receiving terminal connected to a resolver server that provides program information attached with an identifier peculiar to each broadcast program. The broadcast receiving terminal includes a storing unit that stores the program information transmitted from the resolver server, a taste-information acquiring unit that acquires taste information of a user, a program-information-extraction requesting unit that requests, on the basis of the taste information, the resolver server to extract program information, and a program-information receiving unit that receives the program information transmitted from the resolver server.

According to the embodiment, program information is transmitted from the resolver server that provides program information attached with an identifier peculiar to each broadcast program and stored in the storing unit. Taste information of a user is acquired and, on the basis of the taste information, the resolver server is requested to extract program information. The program information transmitted from the resolver server in response to the request is received and stored in the storing unit. The identifier peculiar to each broadcast program is attached to the program information. Since the broadcast receiving terminal can access program information corresponding to the taste information stored in the storing unit, the broadcast receiving terminal can instantaneously retrieve favorite program information of the user. Program information matching tastes of users can be stored in the broadcast receiving terminal. Thus, the number of times of access to the resolver server is reduced and it is possible to prevent accesses from a large number of broadcast receiving terminals to the resolver server from concentrating.

Preferably, the taste-information acquiring unit acquires the taste information on the basis of a history of use of the program information. Consequently, it is possible to accurately acquire the taste information.

Preferably, the broadcast receiving terminal further includes a program-information erasing unit that erases program information stored in the storing unit according to a state of access to the program information. Consequently, it is possible to prevent a storage capacity of the storing unit from excessively increasing.

Preferably, the broadcast receiving terminal further includes an environment-condition setting unit that sets, in a period until a program is broadcasted, predetermined environment conditions including an object medium, keywords of the program, a genre of the program, a cast of the program, and priority orders in the case of extraction and the program-information-extraction requesting unit requests, on the basis of the environment information, the resolver server to extract program information. Consequently, it is possible to improve accuracy in extracting program information.

Preferably, the broadcast receiving terminal further includes a program-information updating unit that updates, when specific program information held by the resolver server is updated, program information stored in the storing unit corresponding to the specific program information. Consequently, it is possible to keep program information stored by the storing unit up to date.

Preferably, the broadcast receiving terminal further includes a display unit that displays the program information and the display unit displays program information of plural broadcasting stations classified on the basis of the identifier on one screen. Consequently, the user can acquire favorite program information out of the program information of the plural broadcasting stations.

Preferably, when the program information held by the resolver server is updated, a display state of an item related to the update among the program information displayed on the display unit is changed. Consequently, it is possible to surely acquire latest information from the updated item.

Preferably, the broadcast receiving terminal further includes a selecting unit that is capable of selecting plural items related to the program information displayed on the display unit and the taste-information acquiring unit acquires taste information of the user on the basis of the selected items. Consequently, it is possible to acquire a taste of the user on the basis of items selected by the user.

Preferably, the program-information-extraction requesting unit requests, when program information requested by the user is not present in the storing unit, the resolver server to extract the program information. Consequently, it is possible to surely acquire desired program information.

According to still another embodiment of the present invention, there is provided a program information retrieval apparatus including a storing unit that stores program information attached with an identifier peculiar to each broadcast program, a program-information-request receiving unit that receives a request for program information based on taste information of a user from a broadcast receiving terminal, a program-information extracting unit that extracts program information matching the taste information from the storing unit using the identifier, and a transmitting unit that transmits the program information extracted from the storing unit to the broadcast receiving terminal.

According to the embodiment, program information attached with an identifier peculiar to each broadcast program is stored in the storing unit, a request for program information based on taste information of the user is received from the broadcast receiving terminal, and program information matching the taste information is extracted from the storing unit using the identifier. The extracted program information is transmitted to the broadcast receiving terminal. Therefore, it is possible to extract program information matching taste information of the user and transmit the program information to the broadcast receiving terminal. The user can acquire desired program information corresponding to a taste of the user from the broadcast receiving terminal.

Preferably, the program-information extracting unit extracts, in a period until a program transmitted from the broadcast receiving terminal is broadcasted, program information matching the taste information on the basis of predetermined environment conditions including an object medium, keywords of the program, a genre of the program, a cast of the program, and priority orders in the case of extraction. Consequently, it is possible to accurately extract program information corresponding to taste information of the user.

Preferably, the program information retrieval apparatus gives the identifier by associating metadata and location information of the broadcast program and is connected to a program information creating apparatus that creates the program information to receive the program information from the program information creating apparatus. Consequently, it is possible to provide program information attached with the identifier by associating the metadata and the location information of the broadcast program with the identifier.

Preferably, when the program information held by the storing unit is updated, the transmitting unit transmits information related to the update to the broadcast receiving terminal. Consequently, the user can acquire latest program information.

According to still another embodiment of the present invention, there is provided a program information retrieval method used in a program information retrieval system in which a broadcast receiving terminal that receives a broadcast program and a resolver server that provides program information attached with an identifier peculiar to each broadcast program are connected through a communication network. The program information retrieval method includes a step of acquiring taste information of a user, a step of requesting, on the basis of the taste information, from the broadcast receiving terminal, the resolver server to provide program information, a step of extracting program information matching the taste information from a master storing unit included in the resolver server using the identifier, and a step of transmitting the extracted program information from the resolver server to the broadcast receiving terminal and storing the program information in a local storing unit of the broadcast receiving terminal.

According to the embodiment, taste information of the user is acquired, the resolver server is requested from the broadcast receiving terminal to provide program information on the basis of the taste information, program information matching the taste information is extracted from the master storing unit included in the resolver server using the identifier, and the extracted program information is transmitted to the broadcast receiving terminal. Since the broadcast receiving terminal can access program information corresponding to the taste information stored in the local storing unit, the broadcast receiving terminal can instantaneously retrieve favorite program information of the user. Program information matching tastes of users are stored in a large number of broadcast receiving terminals connected to the resolver server. Thus, it is possible to prevent accesses from the large number of broadcast receiving terminals to the resolver server from concentrating.

According to still another embodiment of the present invention, there is provided a computer program for causing a computer to function as means for receiving program information attached with an identifier peculiar to each broadcast program from a resolver server that provides program information, means for storing the program information, means for acquiring taste information of a user, and means for requesting, on the basis of the taste information, the resolver server to extract the program information.

According to the embodiment, program information attached with an identifier peculiar to each broadcast program is received from the resolver server that provides program information and stored. On the basis of taste information of the user, the resolver server is requested to extract program information. Therefore, it is possible to extract program information corresponding to a taste of the user from the resolver server and store the program information.

According to still another embodiment of the present invention, there is provided a computer program for causing a computer to function as means for storing program information attached with an identifier peculiar to each broadcast program, means for receiving a request for program information based on taste information of a user from a broadcast receiving terminal, means for extracting program information matching the taste information from the storing unit using the identifier, and means for transmitting the program information extracted from the storing unit to the broadcast receiving terminal.

According to the embodiment, program information attached with an identifier peculiar to each broadcast program is stored and a request for program information based on taste information of the user is received from the broadcast receiving terminal. Program information matching the taste information is extracted from the storing unit using the identifier and the extracted program information is transmitted to the broadcast receiving terminal. Therefore, it is possible to extract program information matching taste information of the user and transmits the program information to the broadcast receiving terminal. The user can acquire desired program information corresponding to a taste of the user.

According to the embodiments of the present invention, it is possible to provide a program information retrieval system, a broadcast receiving apparatus, a program information retrieval apparatus, and a computer program that that are capable of separately acquiring pieces of program information according to taste information of a user.

BRIEF DESCRIPTION OF THE DRAWINGS

FIG. 5 is a diagram showing, in detail, an example of a description of a G-CRID representing program information;

FIG. 9 is a schematic diagram showing an example of taste information;

FIG. 26 is a diagram showing another example of the basic screen and showing a program page corresponding to a preference of the user.

DESCRIPTION OF THE PREFERRED EMBODIMENTS

Figure 1:
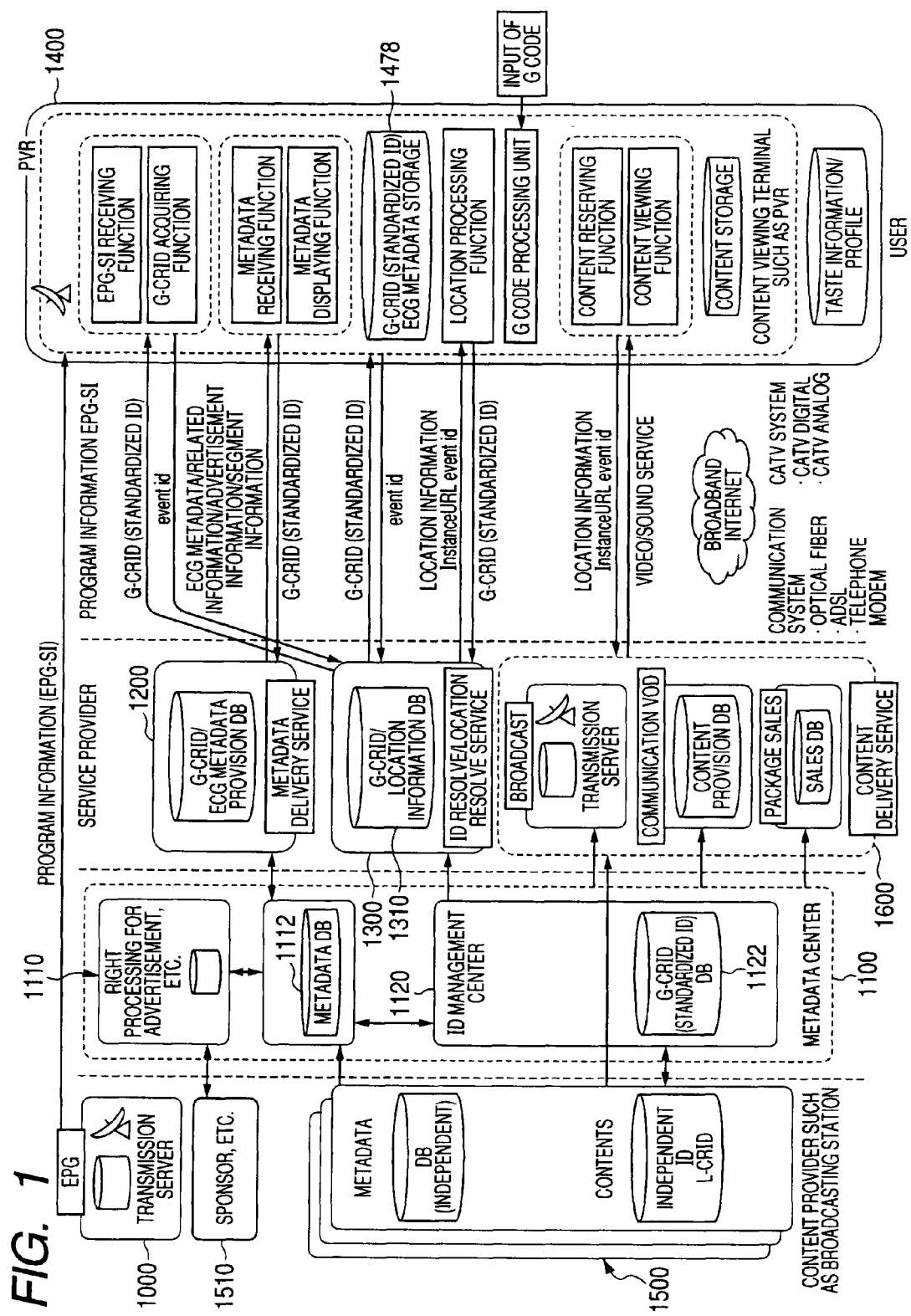
FIG. 1 is a schematic diagram showing the structure of an information retrieval system according to an embodiment of the present invention.

Embodiments of the present invention will be hereinafter explained in detail with reference to the accompanying drawings. In this specification and the drawings, components having substantially identical functions and structures are denoted by identical reference numerals and signs and redundant explanation of the components is omitted.

FIG. 1 is a schematic diagram showing the structure of an information retrieval system according to an embodiment of the present invention. As shown in FIG. 1, the information retrieval system according to this embodiment includes an electronic program guide (EPG-SI) transmission server 1000, a CRID management center 1100, a service provider 1200, an ID resolver 1300, and a broadcast receiving terminal 1400 of a user.

The electronic program guide transmission server 1000 transmits an electronic program guide (EPG-SI) to the broadcast receiving terminal 1400 using means such as a digital broadcast. The CRID management center 1100 includes a metadata center 1110 and an ID management center 1120. The metadata center 1110 receives information forming a basis of metadata from a content provider 1500 such as a broadcasting station, creates metadata, and stores the metadata in a metadata database (DB) 1112. The metadata center 1110 performs right clearance for an advertisement and the like on the basis of information transmitted from a sponsor 1510.

The ID management center 1120 receives data forming a basis of content information of a program from the content provider 1500. The content information includes location information representing a broadcast date and time of the program. The content information of the program is managed with an independent event_id set for each broadcasting station or a local CRID (Content Reference ID) independent for each broadcasting station. The CRID management center 1100 associates the content information managed with the independent event_id or the local CRID and metadata to form program information and gives a G-CRID (Global-Content Reference ID), which is a globally applicable standardized ID, to the program information. The program information managed with the G-CRID is stored in a G-CRID database 1122.

The program information created by the CRID management center 1100 and attached with the G-CRID is transmitted to the ID resolver 1300. The ID resolver 1300 stores the transmitted G-CRID in the master CRID database 1310. The metadata created by the metadata center 1110 is transmitted to the service provider 1200 of a metadata delivery service.

The service provider 1200 transmits the metadata to the broadcast receiving terminal 1400 through an information communication network such as the Internet. The broadcast receiving terminal 1400 receives the metadata with a metadata receiving function and displays the metadata with a metadata displaying function.

The content created by the content provider 1500 is transmitted to the broadcast receiving terminal 1400 by a content delivery service 1600. The content delivery service 1600 includes a server that transmits a broadcast and a server of communication VOD and performs sales of packages. The broadcast receiving terminal 1400 views the content with a content viewing function. The broadcast receiving terminal 1400 can reserve viewing of the content with a content reserving function.

The broadcast receiving terminal 1400 has an EPG-SI receiving function of receiving the electronic program guide (EPG-SI) transmitted by the electronic program guide transmission server 100. The broadcast receiving terminal 1400 has a G-CRID acquiring function of acquiring a G-CRID from the ID resolver 1300.

The broadcast receiving terminal 1400 is connected to the ID resolver 1300 through the information communication network such as the Internet. The broadcast receiving terminal 1400 has a location processing function of acquiring a G-CRID from the ID resolver 1300 when necessary and storing the G-CRID in a local CRID database 1478.

When the broadcast receiving terminal 1400 receives the electronic program guide (EPG-SI) from the electronic program guide transmission server 100 and requests a G-CRID corresponding to the electronic program guide, the corresponding G-CRID may not be present in the local CRID database 1478. In this case, the broadcast receiving terminal 1400 requests the ID resolver 1300 to transmit a G-CRID corresponding to an event_id of the electronic program guide. The ID resolver 1300 searches through G-CRIDs stored in the master CRID database 1310 according to the request from the broadcast receiving terminal 1400 and extracts the G-CRID corresponding to the request. The ID resolver 1300 transmits the extracted G-CRID to the broadcast receiving terminal 1400 together with program information related to the G-CRID.

The broadcast receiving terminal 1400 stores the G-CRID transmitted from the ID resolver 1300 in the local CRID database 1478. Therefore, after the requested G-CRID is stored in the local CRID database 1478, it is possible to view predetermined program information by referring to program information of the G-CRID stored in the local CRID database 1478.

Figure 2:
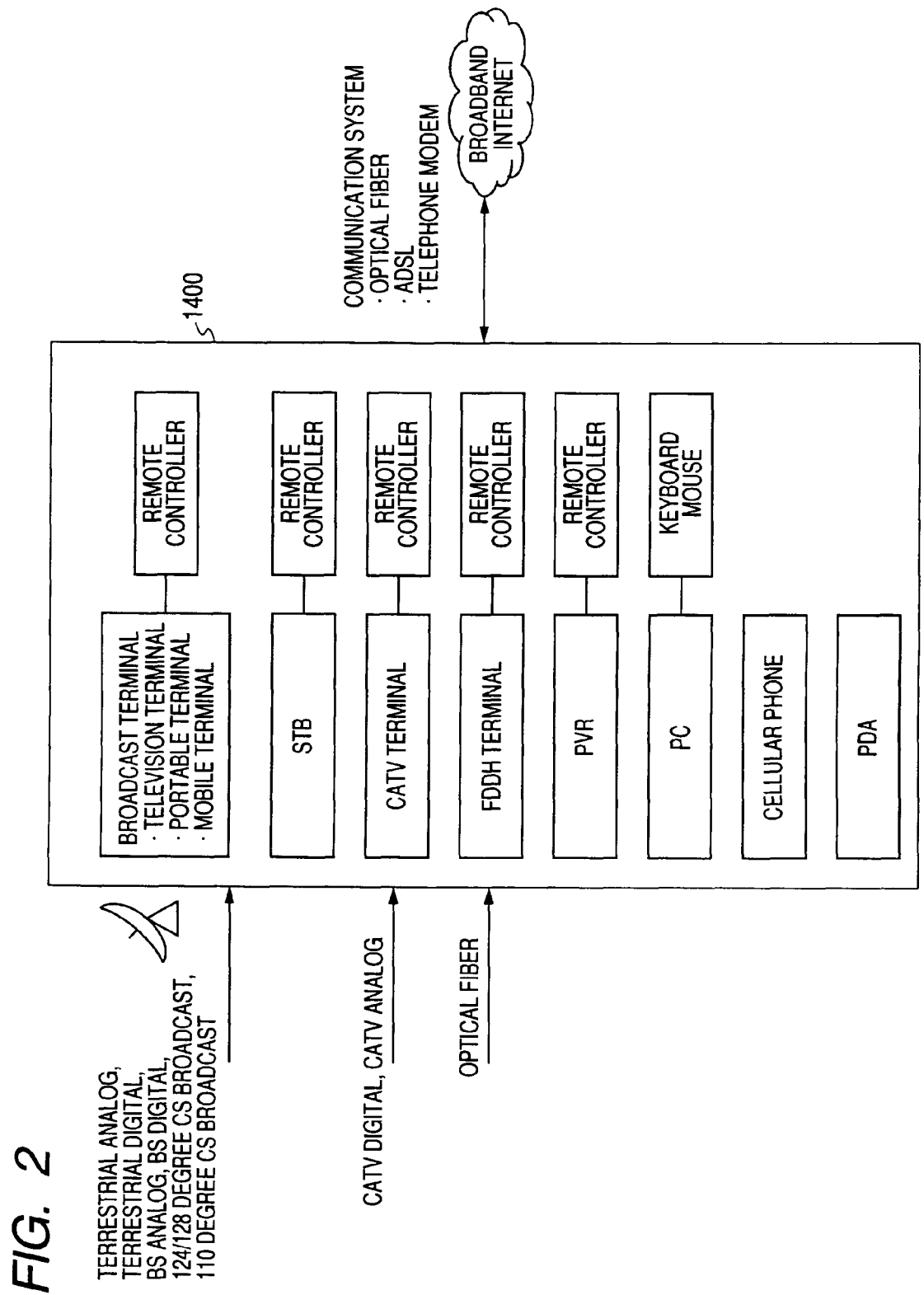
FIG. 2 is a schematic diagram showing a type of a broadcast receiving terminal.

FIG. 2 is a schematic diagram showing a type of the broadcast receiving terminal 1400. The broadcast receiving terminal 1400 is a terminal that receives various broadcasts such as a terrestrial analog broadcast, a terrestrial digital broadcast, a BS analog broadcast, a BS digital broadcast, a 124/128 degree CS broadcast, a 110 degree CS broadcast, a CATV digital broadcast, a CATV analog broadcast, and an optical fiber broadcast. Specific examples of the broadcast receiving terminal 1400 includes broadcast terminals such as a television terminal, a portable terminal, and a mobile terminal, an STB, a CATV terminal, an FDDH terminal, a PVR, a PC, a cellular phone, and a PDA. These terminals can be operated by remote controllers. These terminals can communicate with the information communication network such as the Internet through an optical fiber, an ADSL, a telephone modem, and the like.

Figure 3:
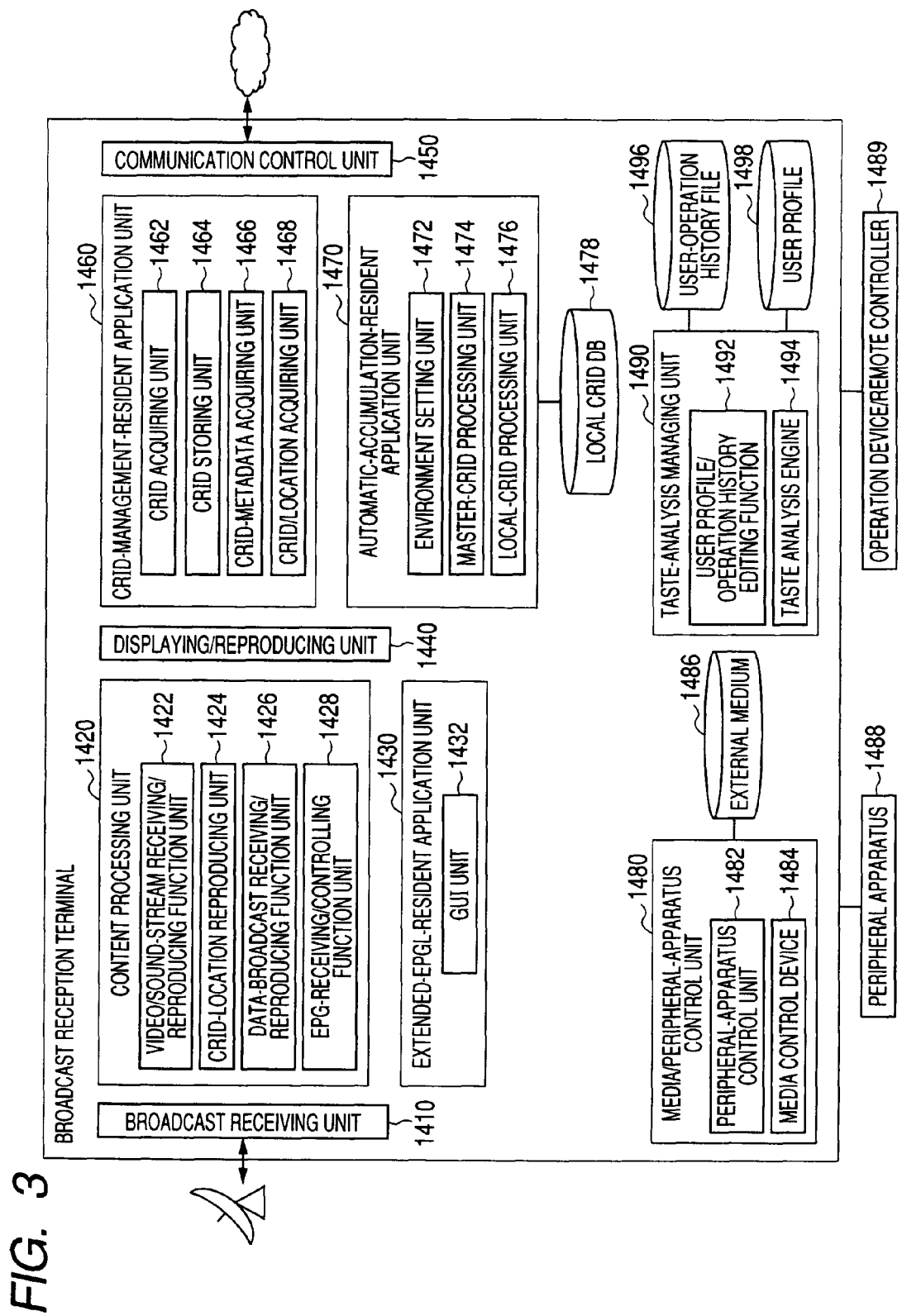
FIG. 3 is a schematic diagram showing the structure of the broadcast receiving terminal.

FIG. 3 is a schematic diagram showing the structure of the broadcast receiving terminal 1400. Respective functional blocks of the broadcast receiving terminal 1400 are controlled by a computer system including a CPU. Programs for causing the respective functional blocks to function are stored in storing means (ROM, RAM, HDD, etc.) included in the broadcast receiving terminal 1400. The programs can also be stored in a recording medium detachably attachable to the broadcast receiving terminal 1400. As shown in FIG. 3, the broadcast receiving terminal 1400 includes a broadcast receiving unit 1410, a content processing unit 1420, an extended-EPG-resident application unit 1430, and a displaying/reproducing unit 1440. The content processing unit 1420 includes a video/sound-stream reception/reproduction function unit 1422, a CRID/location reproducing unit 1424, a data-broadcast receiving/reproducing function unit 1426, an EPG-receiving/controlling function unit 1428. The content processing unit 1420 processes content received through the broadcast receiving unit 1410 and mainly performs reception, reproduction, and the like of a video, sound, a data broadcast, and an electronic program guide (EPG). The extended-EGP-resident application unit 1430 includes a GUI unit 1432.

The broadcast receiving terminal 1400 includes a communication control unit 1450, a CRID-management-resident application unit 1460, and an automatic-accumulation-resident application unit 1470. The CRID-management-resident application unit 1460 includes a CRID acquiring unit 1462, a CRID storing unit 1464, a CRID/metadata acquiring unit 1466, and a CRID/location acquiring unit 1468. The CRID-management-resident application unit 1460 mainly performs acquisition and storage of a CRID and acquisition of metadata and location information from the CRID. The automatic-accumulation-resident application unit 1470 includes an environment setting unit 1472, a master-CRID processing unit 1474, and a local-CRID processing unit 1476. The local CRID database 1478 is connected to the automatic-accumulation-resident application unit 1470.

The broadcast receiving terminal 1400 includes a media/peripheral-apparatus control unit 1480. The media/peripheral-apparatus control unit 1480 includes a peripheral-apparatus control unit 1482 and a media control device 1484. An external medium 1486 is connected to the media/peripheral-apparatus control unit 1480.

The broadcast receiving terminal 1400 includes a taste-analysis managing unit 1490. The taste-analysis managing unit 1490 includes a user profile/operation history editing function unit 1492 and a taste analysis engine unit 1494. A user-operation history file 1496 and a user profile 1498 are connected to the taste-analysis managing unit 1490.

A peripheral apparatus 1488 and an operation device (a remote controller) 1489 are connected to the broadcast receiving terminal 1400.

Figure 4:
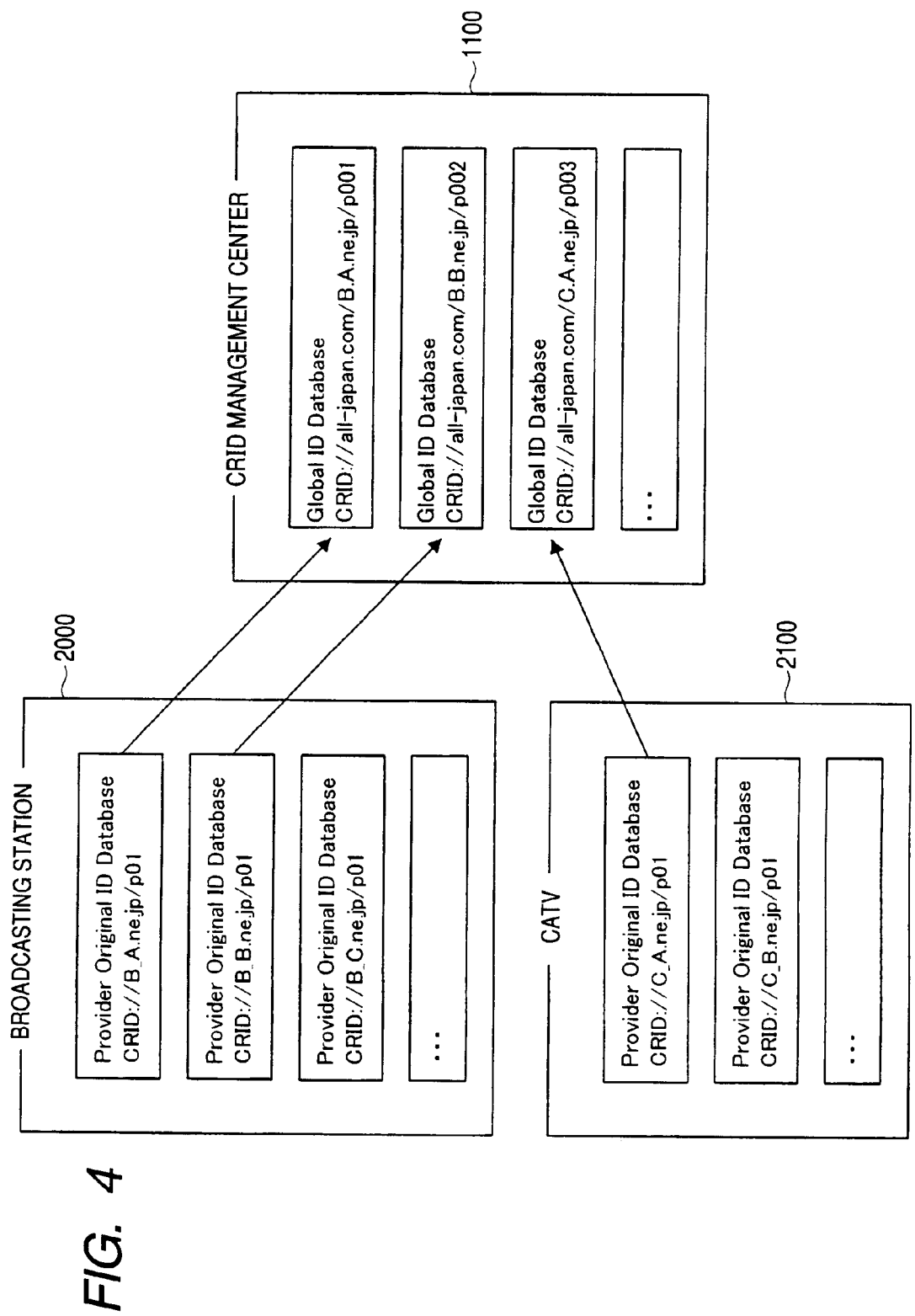
FIG. 4 is a schematic diagram showing a state in which a G-CRID of an ID standardized in a CRID management center is given.

FIG. 4 is a schematic diagram showing a state in which a G-CRID of an ID standardized by the CRID management center 1100 is given. As shown in FIG. 4, in a broadcasting station 2000 of ground waves, a CRID is given to each piece of program information of respective programs. In a broadcasting station 2100 of CATV, a CRID is also given to each piece of program information of respective programs. The CRIDs given in the broadcasting stations 2000 and 2100 are local CRIDs (L-CRIDs) that are effective only in the broadcasting stations 2000 and 2100.

The CRIDs given in the broadcasting stations 2000 and 2100 are transmitted to the CRID management center 1100 including the metadata center 1110 and the ID management center 1120 in FIG. 1. The CRID management center 1100 manages the CRIDs given in the broadcasting stations 2000 and 2100 and gives a globally applicable G-CRID to program information obtained by associating content information managed with the local CRIDs and metadata.

As a result, it is possible to separately manage all pieces of program information on the basis of the global G-CRID even outside the broadcasting stations. The G-CRID given by the CRID management center 1100 is unique to all the pieces of program information. Thus, an arbitrary G-CRID does not correspond to plural pieces of program information and it is possible to retrieve specific piece of program information on the basis of the G-CRID.

The G-CRID given by the CRID management center 1100 continues to correspond to information on a program of the G-CRID even after a broadcast of the program is finished. In other words, a G-CRID representing a specific program is not reused as a CRID representing another program even after a broadcast of a program of the G-CRID is finished. Therefore, it is possible to specify program information on the basis of the G-CRID even after the program broadcast is finished.

FIG. 5 is a diagram showing, in detail, an example of a description of a G-CRID representing program information and shows an example of a description of a metadata file of the program information. In FIG. 5, program information in which information such as a genre, keywords, a cast, and the like of a program is described is shown in association with the G-CRID.

In FIG. 5, the G-CRID is a domain portion "crid://all-japan.com/provider.com/p001". An ID indicating the program information is described in an html format after the domain portion.

In the example in FIG. 5, name="pirates" is described after the G-CRID and it is described that a title of a program corresponding to the G-CRID is "pirates". After <details>, various kinds of information concerning this program are described.

For example, <genre="movie"/> indicates that a genre of theprogramis movie. <keywords="Jack Action Adventure Comedy Sequel Burn at the Stake"/> indicates that keywords of the program are "Jack Sparrow", "Action Adventure", "Comedy", "Sequel", and "Burn at the Stake".

After <CreditsLilst>, names of casts are described. <cast_id="1_1" name="Keira Kightley" Birthplace="England"/> indicates that one of the casts is Keira Kightley and born in England. In two rows below the description, it is described that the casts are "John Depp" and "Orl Bloom".

Therefore, the broadcast receiving terminal 1400 can obtain program information more detailed than an electronic program guide transmitted from the electronic program guide transmission server 1000 by extracting the G-CRID given by the G-CRID management center 1100 from the ID resolver 1300. The broadcast receiving terminal 1400 can also create an extended electronic program guide (extended EPG) by creating a program guide on the basis of program information obtained by such a method. In the explanation of this embodiment, the G-CRID and the program information following the G-CRID may be collectively referred to as G-CRID.

As types of the CRID, there are a "Group CRID" and a "Program CRID".

The "Group CRID" is an identifier representing a group including plural programs such as a serial program and programs in the same genre. The Group CRID is described, for example, as follows.

CRID://<DNS name of provider>/<identification name of unique program in provider>

Example) CRID://provider.com/g01

The "Program CRID" is an identifier representing information on a program shown in FIG. 5. The Program CRID is described as follows.

CRID://<DNS name of provider>/<identification name of unique program in provider>

Example) CRID://provider.com/p01

CRID://<DNS name of ID management center>/<DNS name of unique provider in Japan>/<identification name of program>

Example) CRID://all-japan.com/provider.com/p001

An "Instance URL" is a URL indicating an actual location of a program. The Instance URL represents an event_id representing an electronic program guide, a URL for performing sales on a network, and the like. When the Instance URL represents the event_id, the Instance URL is described as follows using an arib_url (dvb_url) and the like.

arib://<original_network_id>.<transport_stream_id>.<service_id>.<event_id>

When the Instance URL represents a communication VOD, the Instance URL is described as follows.

rtsp://vod-center/p001.sdp

In the case of package sales and advertisement, the Instance URL is described as follows.

http://xxxx-style.com/a.html

The CRID management center 1100 gives Group CRIDs, Program CRIDs, and Instance URLs to information such as content information and metadata obtained from respective broadcasting stations and manages the information. Therefore, the user can obtain various kinds of program information on the basis of these G-CRIDs.

Figure 6A:
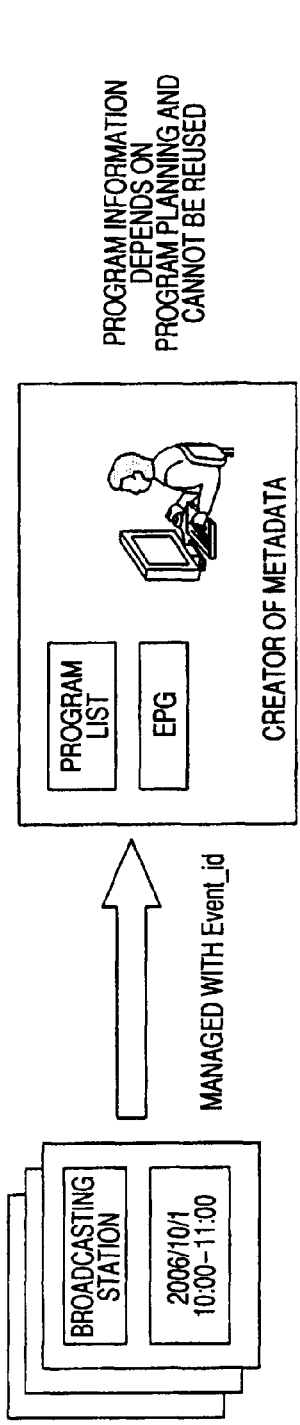
FIGS. 6A and 6B are schematic diagrams showing a service performed in the past concerning provision of program information and a service according to the embodiment of the present invention in comparison with each other.
Figure 6B:
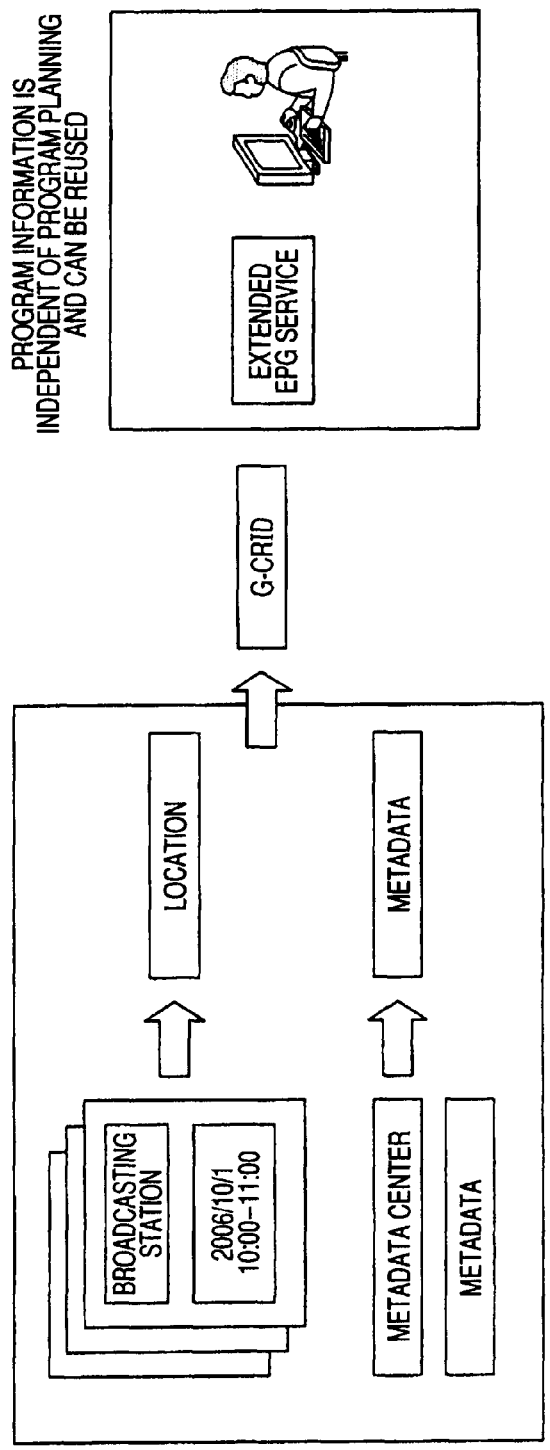

FIGS. 6A and 6B are schematic diagrams showing a service performed in the past concerning provision of program information and a service according to this embodiment in comparison with each other. FIG. 6A shows the service in the past as a comparative example and FIG. 6B shows the service according to this embodiment.

In the comparative example shown in FIG. 6A, program information managed with event_ids is transmitted from respective broadcasting stations to a creation source that creates program metadata. Program information such as a program guide on paper and an electronic program guide (EPG) is created. The program information (metadata) created here is provided to the user through media such as the paper and the Internet. The event_id is an identifier for identifying an event included in an event information table. The event_id is a 16-bit identification number and uniquely allocated in one service. Since the event_id is resolved into be time information and location information, the event_id can be regarded as pre-stage information of the location information (or may be information that can be resolved into the location information in the end or the location information). In the method of the comparative example for managing program information with the event_id, provided program information depends on scheduling of programs, it is difficult to acquire the program information because of a reason of scheduling when, for example, a broadcast is finished, and it is difficult to reuse the program information.

On the other hand, in the example according to this embodiment, program information (location information) obtained from respective broadcasting stations and metadata obtained from a metadata center are associated with each other by an identifier of the G-CRID and managed. The location information and the metadata managed with the G-CRID are provided to the user as an extended electronic program guide (extended EPG). Since the G-CRID is separately given to each program, the G-CRID can be managed independently of scheduling of programs. Even after a broadcast is finished, it is possible to manage the program information on the basis of the G-CRID and provide the user with the program information.

Figure 7:
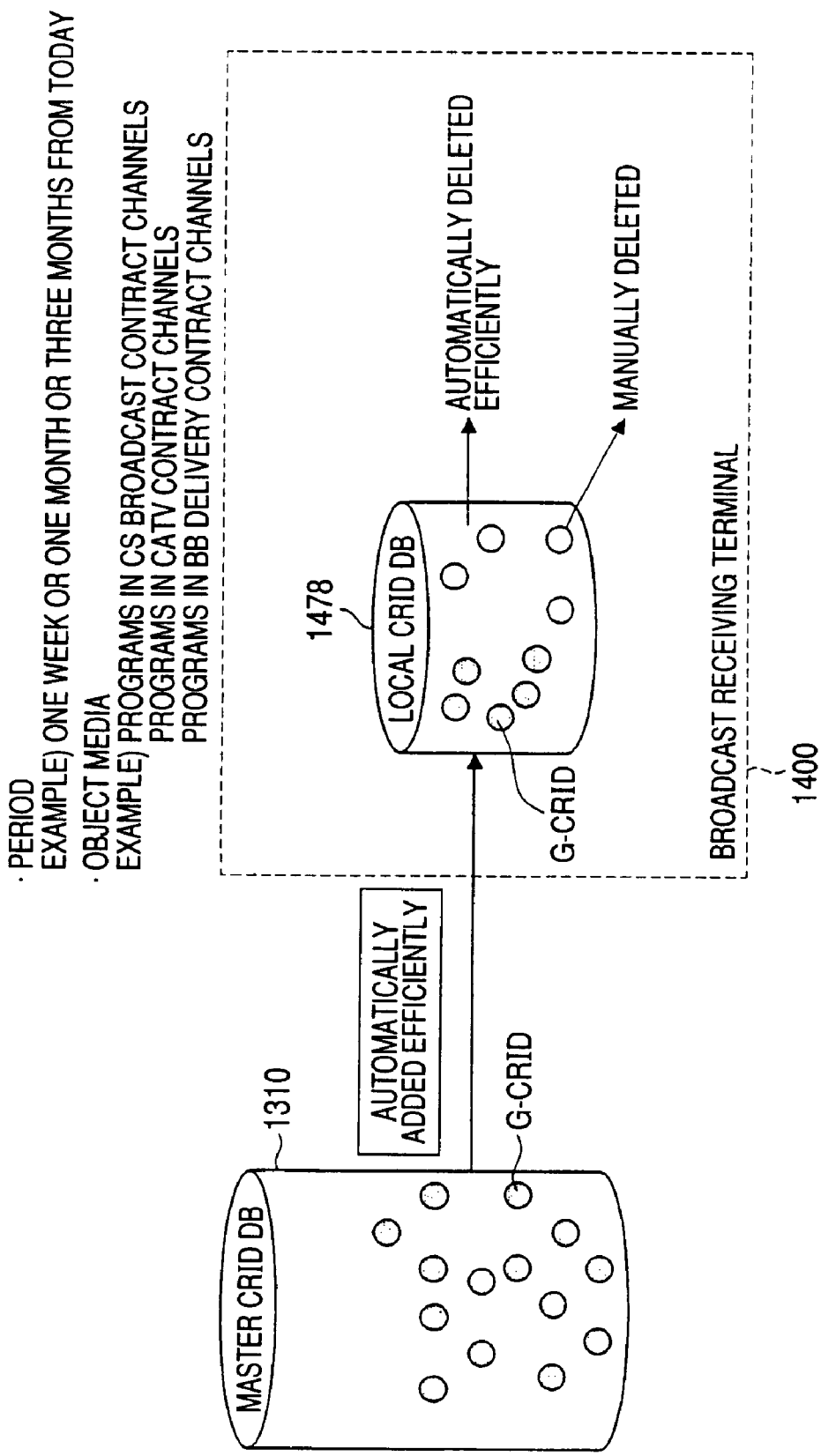
FIG. 7 is a schematic diagram showing a relation between a local CRID database of the broadcast receiving terminal and a master CRID database of an ID resolver.

A mechanism of the broadcast receiving terminal 1400 for acquiring information on the basis of a taste of the user is explained. The broadcast receiving terminal 1400 communicates with the ID resolver 1300 via the communication control unit 1450. FIG. 7 is a schematic diagram showing a relation between the local CRID database 1478 of the broadcast receiving terminal 1400 and the master CRID database 1310 of the ID resolver 1300. In this embodiment, G-CRIDs are accumulated in the local CRID database 1478 of the broadcast receiving terminal 1400 according to a taste of the user.

As shown in FIG. 7, G-CRIDs created by the CRID management center 1100 are accumulated in the master CRID database 1310 of the ID resolver 1300. A G-CRID of a program matching a taste of the user among the G-CRIDs accumulated in the master CRID database 1310 is transmitted to the local CRID database 1478 as appropriate. A G-CRID same as the transmitted G-CRID is stored in the master CRID database 1310. When program information included in the G-CRID is updated, the G-CRID stored in the master CRID database 1310 is updated.

In an example in FIG. 7, in a period in which a G-CRID is extracted from the local CRID database 1478, a G-CRID matching a taste of the user is transmitted out of media as objects of the extraction of the G-CRID. The taste of the user is mainly judged by the taste-analysis managing unit 1490. The period in which the G-CRID is extracted represents a period until a broadcast date and is selected from, for example, periods of one week, one month, and three months. When the period is one week, a G-CRID of a program to be broadcasted in one week from today is extracted. The user can select these periods by operating the broadcast receiving terminal 1400.

As the media as the objects, there are programs in CS broadcast channels, programs in CATV contract channels, programs in BB delivery contract channels, and the like. The user can select which medium is set as an object by operating the broadcast receiving terminal 1400.

The G-CRID transmitted from the master CRID database 1310 is stored in the local CRID database 1478. In the local CRID database 1478, G-CRIDs are appropriately changed as time elapses. For example, the user can automatically delete, according to a setting, a G-CRID of a program, which is finished to be broadcasted, from the local CRID database 1478. The user can manually delete the G-CRID in the local CRID database 1478 as well.

The broadcast receiving terminal 1400 requests the ID resolver 1300 to transmit a G-CRID matching a taste of the user. The ID resolver 1300 extracts a G-CRID in the master CRID database 1310 and transmits the G-CRID to the broadcast receiving terminal 1400. The G-CRID transmitted to the broadcast receiving terminal 1400 is stored in a free area in the local CRID database 1478. Therefore, G-CRIDs matching the taste of the user are typically accumulated in the local CRID database 1478.

Therefore, the user can retrieve information on a favorite program from the broadcast receiving terminal 1400 by accessing the local CRID database 1478 of the broadcast receiving terminal 1400. Consequently, compared with an access to the master CRID database 1310 of the ID resolver 1300 through the Internet or the like, it is possible to acquire desired program information at high speed.

When a G-CRID matching the taste of the user is not present in the local CRID database 1478, it is possible to surely extract program information matching the taste of the user by accessing the master CRID database 1310. Therefore, it is possible to retrieve a desired G-CRID out of a large number of G-CRIDs by extracting a G-CRID using both the local CRID database 1478 and the master CRID database 1310.

Figure 8:
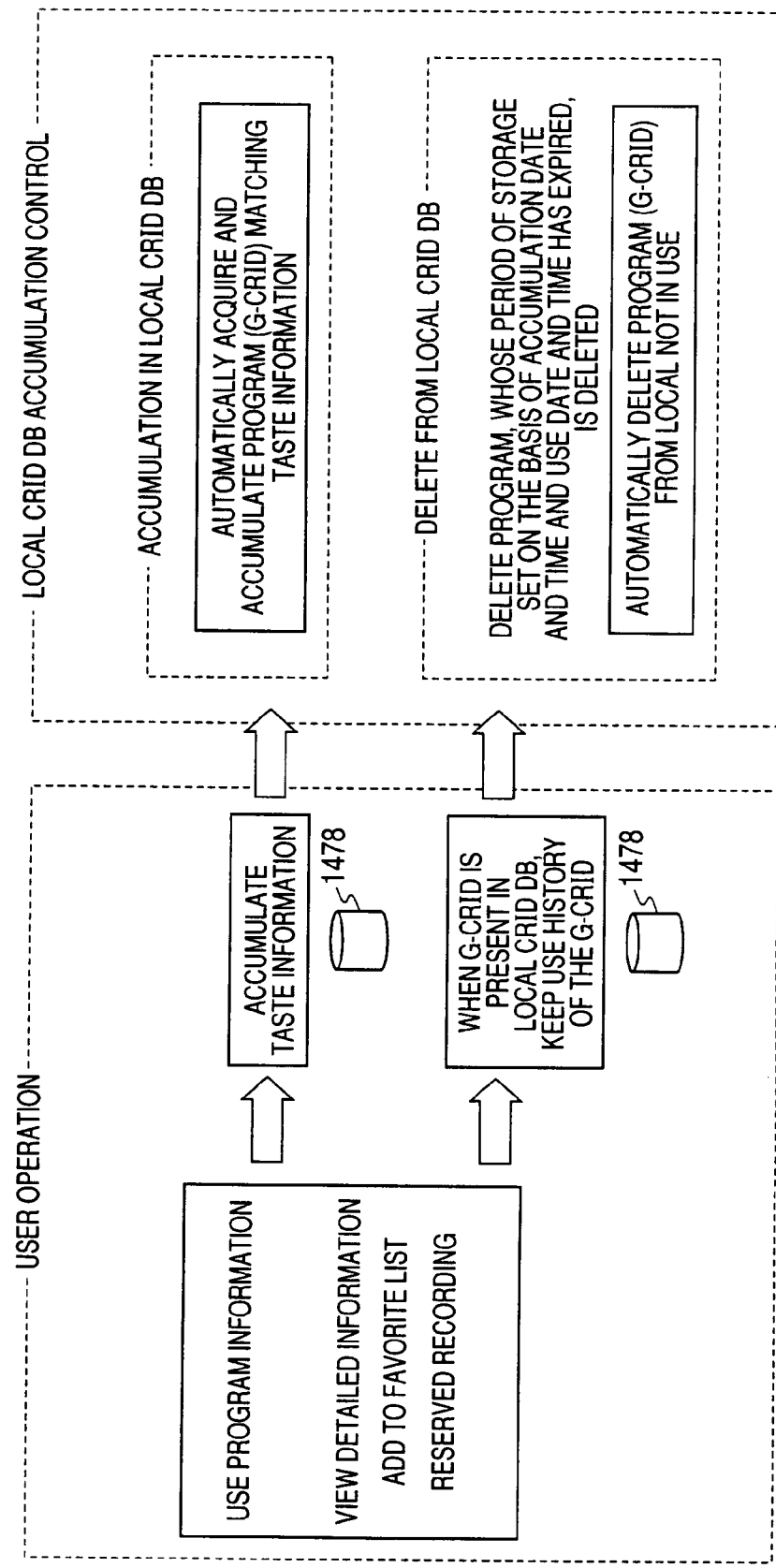
FIG. 8 is a schematic diagram showing, in detail, a flow of accumulation of G-CRIDs in the local CRID database.

FIG. 8 is a diagram showing, in detail, a flow of accumulation of a G-CRID in the local CRID database 1478. As shown in FIG. 8, the accumulation of a G-CRID in the local CRID database 1478 is performed on the basis of taste information or a history of use.

When the user uses program information using the broadcast receiving terminal 1400, taste information of the user is accumulated according to the use of the program information. When a used G-CRID is already present in the local CRID database 1478, a history of use of the G-CRID is kept. Examples of the use of the program information include viewing of detailed information of a program, addition of the program information to a favorite list, and operation of reserved recording and the like. As the taste information and the history of use accumulated, there is a G-CRID corresponding to the used program information. The taste information and the history of use are accumulated in the local CRID database 1478.

The broadcast receiving terminal 1400 automatically acquires, on the basis of the accumulated taste information, a G-CRID of a program matching the taste information from the master CRID database 1310 and accumulates the G-CRID in the local CRID database 1478.

A G-CRID of a program, a period of which set in advance has expired, is deleted from the local CRID database 1478 on the basis of a date and time when the G-CRID is accumulated in the local CRID database 1478 and a date and time when program information is used. Consequently, a G-CRID of a program not used is automatically deleted and it is possible to accumulate G-CRIDs in a free area anew.

The accumulation of data in the local CRID database 1478 is mainly performed by the environment setting unit 1472, the master-CRID processing unit 1474, and the local-CRID processing unit 1476 of the automatic-accumulation-resident application unit 1470 shown in FIG. 3.

FIG. 9 is a schematic diagram showing an example of taste information. The taste information shown in FIG. 9 is described on the basis of a taste of the user accumulated according to the user of a program. The user may input the taste information by operating the broadcast receiving terminal 1400.

In the example in FIG. 9, the taste information is described on Oct. 1, 2006. It is described that, concerning a "genre", tastes of the user are movie, drama, and sports. It is described that, concerning "keywords", tastes of the user are "Korean style", "overseas travel", and "brain". It is described that, concerning a "cast", tastes of the user are "Keira Kightely" and "Jody Ster".

An example of a method of storing a G-CRID of program information from the master CRID database 1310 to the local CRID database 1478 on the basis of taste information is explained in detail with reference to FIG. 10.

Figure 10:
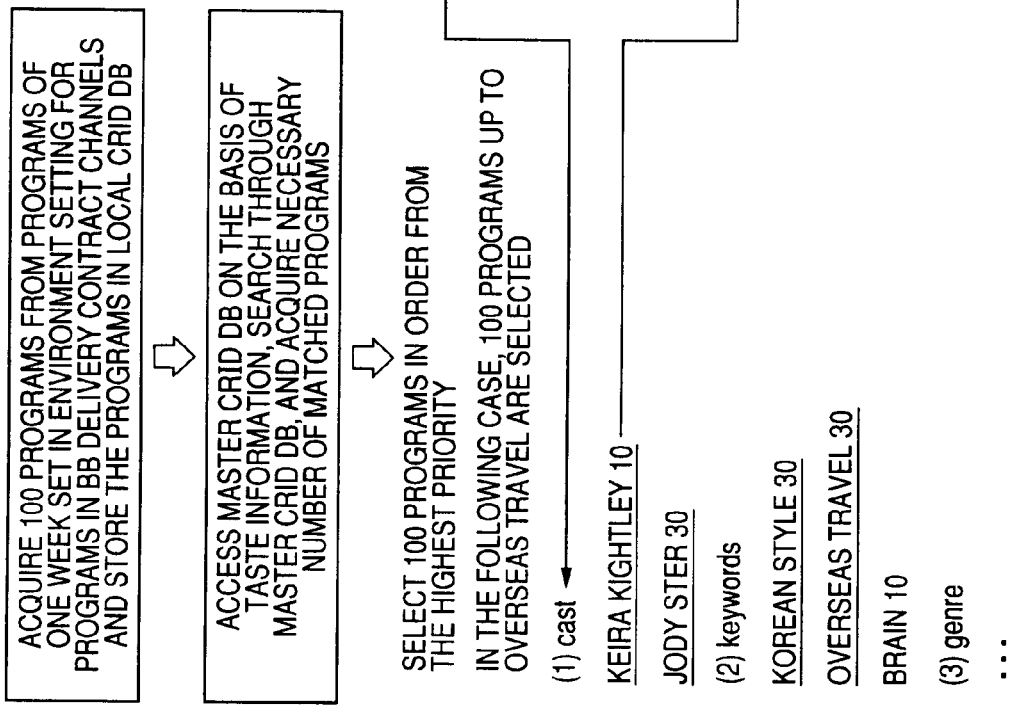
FIG. 10 is a schematic diagram showing a method of storing a G-CRID of program information from the master CRID database to the local CRID database on the basis of the taste information.

In the example in FIG. 10, an example of environment setting, a period of one week from today is set. As a medium as an object, a program in the BB delivery contract channel is set.

A taste of the user is specified by a taste information file. As taste information, the genre is set in "movie", "drama", and "sports", the keywords are set in "Korean style", "overseas travel", and "brain", and the cast is set in "Keira Kightley" and "Jody Ster".

Priority orders in retrieval are set by an environment setting file. The priority orders are set in an order of (1) cast, (2) keywords, and (3) genre.

Here, 100 programs are acquired from G-CRIDs in the master CRID database 1310 with the period set in the environment setting as an object on the basis of descriptions of the taste information file and the environment setting file.

In this case, 100 programs are selected from one having a highest priority order in the priority orders set in the environment setting file. In the example in FIG. 10, since a priority order of the cast is the highest, G-CRIDs, casts of which are "Keira Kightley" and "Jody Ster", are extracted first. Since the number of extracted programs is 30 in total, G-CRIDs, keywords of which are "Korean style", "overseas", "travel", and "brain", are extracted on the basis of the "keywords" having the second highest priority order. As shown in FIG. 10, since the G-CRID of the program as the accumulation object includes "Keira Kightley" as a cast, G-CRIDs can be extracted on the basis of the G-CRID.

In the example in FIG. 10, when G-CRIDs, keywords of which are "Korean style" and "overseas travel", are extracted, a total number of extracted G-CRIDs is 100. Thus, the extracted 100 G-CRIDs are stored in the local CRID database 1478.

In this way, G-CRIDs are extracted in accordance with the priority orders and, when the number of extracted G-CRIDs reaches 100, the extraction of G-CRIDs is finished. Therefore, it is possible to extracts G-CRIDs from the master CRID database 1310 on the basis of the taste information of the user.

When G-CRIDs are extracted, if the broadcast receiving terminal 1400 typically accesses the ID resolver 1300, it is anticipated that accesses from the large number of broadcast receiving terminals 1400 to the ID resolver 1300 concentrate, processing of the extraction and the like slows down, and convenience falls.

According to this embodiment, since it is possible to store G-CRIDs in the local CRID database 1478 in advance, it is possible to prevent accesses from the large number of broadcast receiving terminals 1400 to the ID resolver 1300 from concentrating. Therefore, it is possible to efficiently perform extraction of G-CRIDs.

Figure 11:
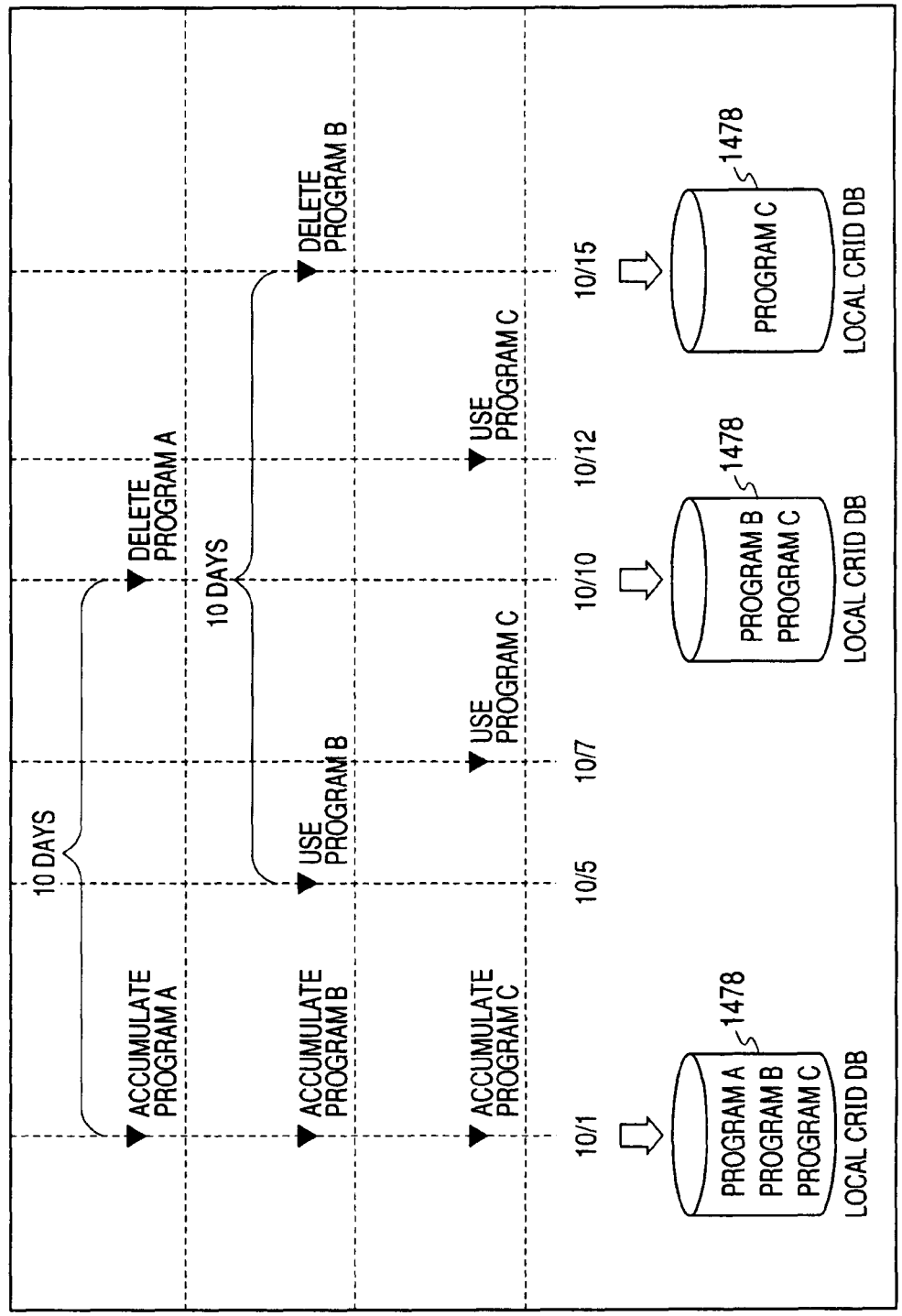
FIG. 11 is a schematic diagram showing a method of deleting a G-CRID from the local CRID database.

FIG. 11 shows a method of deleting a G-CRID from the local CRID database 1478. Here, it is explained how G-CRIDs of a program A, a program B, and a program C stored in the local CRID database 1478 are deleted.

In principle, a G-CRID stored in the local CRID database 1478 is deleted when a period set in advance elapses from a date and time the G-CRID is accessed last. FIG. 11 shows an example in which the period is set to 10 days.

In FIG. 11, the G-CRIDs of the program A, the program B, and the program C are accumulated in the local CRID database 1478 on October 1. Since the G-CRID of the program A has not been accessed by the user for ten days until October 10 after the G-CRID was accumulated in the local CRID database 1478 on October 1, the G-CRID is deleted on October 10. Therefore, on October 10, the G-CRID of the program B and the program C remain in the local CRID database 1478.

The G-CRID of the program B was accessed by the user on October 5 after the G-CRID was accumulated in the local CRID database 1478 on October 1. Thereafter, since the G-CRID has not been accessed by the user for ten days until October 15, the G-CRID of the program B is deleted on October 15.

The G-CRID of the program C was accessed by the user on October 7 and October 12 after the G-CRID was accumulated in the local CRID database 1478 on October 1. On October 15, since ten days have not elapsed from the last date of access, the G-CRID of the program C remains in the local CRID database 1478.

It is possible to surely secure a free space of a capacity in the local CRID database 1478 by automatically deleting G-CRIDs with low access frequencies from the local CRID database 1478. It is possible to typically secure latest G-CRIDs corresponding to taste information of the user in the local CRID database 1478 by adding a new G-CRID to the local CRID database 1478 according to the taste information. Since the user does not need to select and delete a G-CRID of an unnecessary program, complicated processing is unnecessary.

On the broadcast receiving terminal 1400 side, the extraction of a G-CRID corresponding to taste information and the deletion of the G-CRID described above are performed mainly by the automatic-accumulation-resident application unit 1470 and the taste-analysis managing unit 1490. The environment setting unit 1472 of the automatic-accumulation-resident application unit 1470 sets the environment conditions described above. The master-CRID processing unit 1474 requests, through the communication control unit 1450, the ID resolver 1300 to transmit a G-CRID matching the taste information. The local-CRID processing unit 1476 stores the G-CRID transmitted from the ID resolver 1300 in the local CRID database 1478 and deletes an unnecessary G-CRID.

The acquisition of taste information of the user is performed mainly be the taste-analysis managing unit 1490. The user profile/operation history editing function unit 1492 of the taste-analysis managing unit 1490 acquires a history of operation and a history of use by the user. The taste analysis engine 1494 analyzes a taste of the user on the basis of the history of operation and the history of use. The history of operation and the history of use by the user are stored in the user-operation history file 1496. The taste information of the user is stored in the user profile 1498.

Besides the master CRID database 1310, the ID resolver 1300 includes a receiving unit that receives a request for program information based on taste information from the broadcast receiving terminal 1400, a program-information extracting unit that extracts a G-CRID matching the taste information from the master CRID database 1310, and a transmitting unit that transmits program information extracted from the master CRID database 1310 to the broadcast receiving terminal 1400. The respective functional blocks of the ID resolver 1300 are controlled by a computer system including the CPU. Programs for causing the respective functional blocks to function are stored in storing means (ROM, RAM, HDD, etc.) included in the ID resolver 1300. The programs are also stored in a recording medium detachably attachable to the ID resolver 1300.

Figure 12:
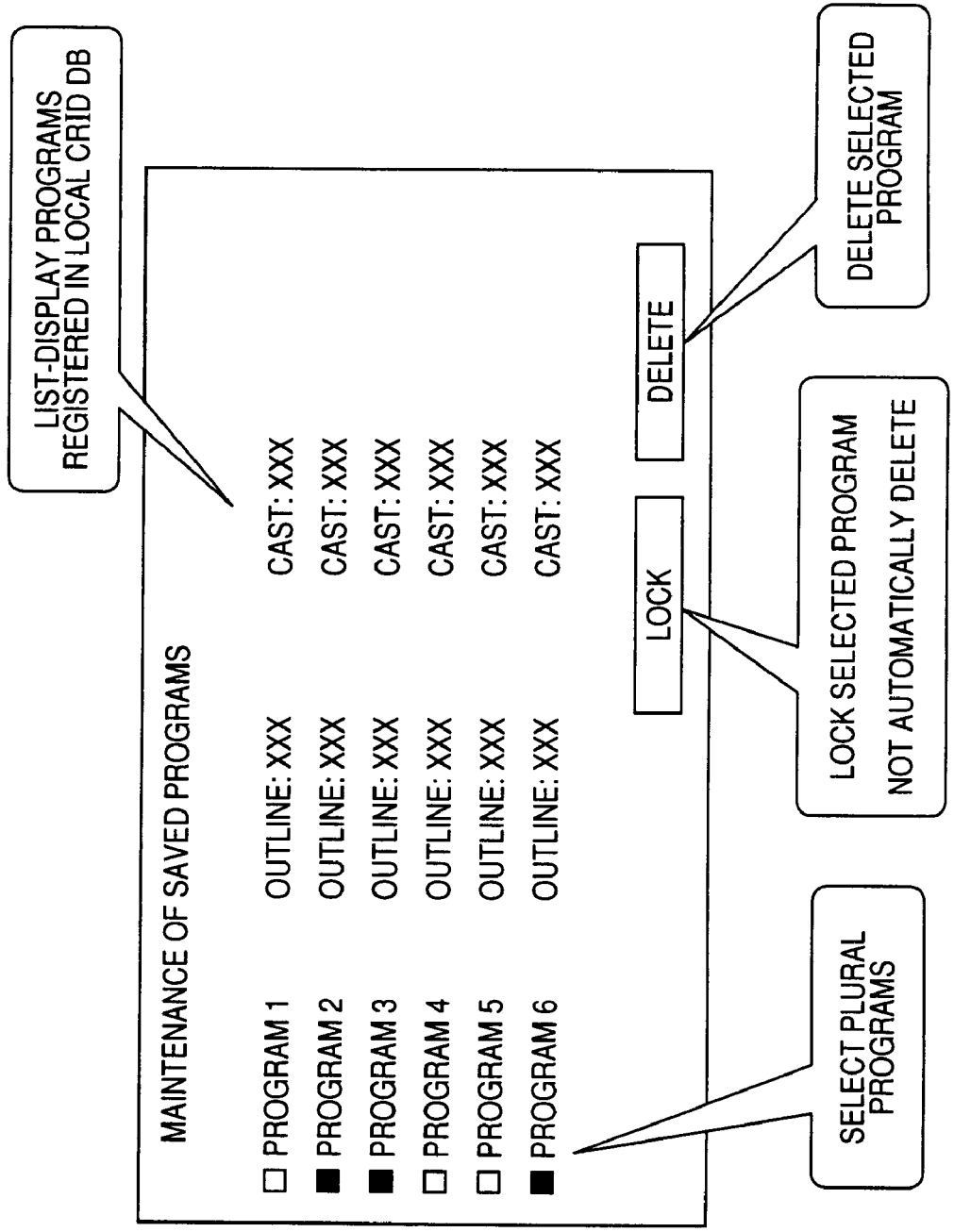
FIG. 12 is a schematic diagram showing an image of a maintenance screen of the local CRID database.

FIG. 12 is a schematic diagram showing an image of a maintenance screen of the local CRID database 1478. The screen in FIG. 12 is displayed on the displaying/reproducing unit 1440 of the broadcast receiving terminal 1400.

In an example in FIG. 12, a program 2, a program 3, and a program 6 are selected. When "lock" is clicked in this state, states of the program 2, the program 3, and the program 6 are locked. The locked programs are not automatically deleted on the basis of a history of use and the like. Therefore, the user can typically keep G-CRIDs of these programs in the local CRID database 1478.

When "delete" is clicked in the state in which the program 2, the program 3, and the program 6 are selected, it is possible to delete the G-CRIDs of the selected programs. Therefore, the user can manually delete the G-CRIDs without waiting for the G-CRIDs to be automatically deleted.

Figure 13:
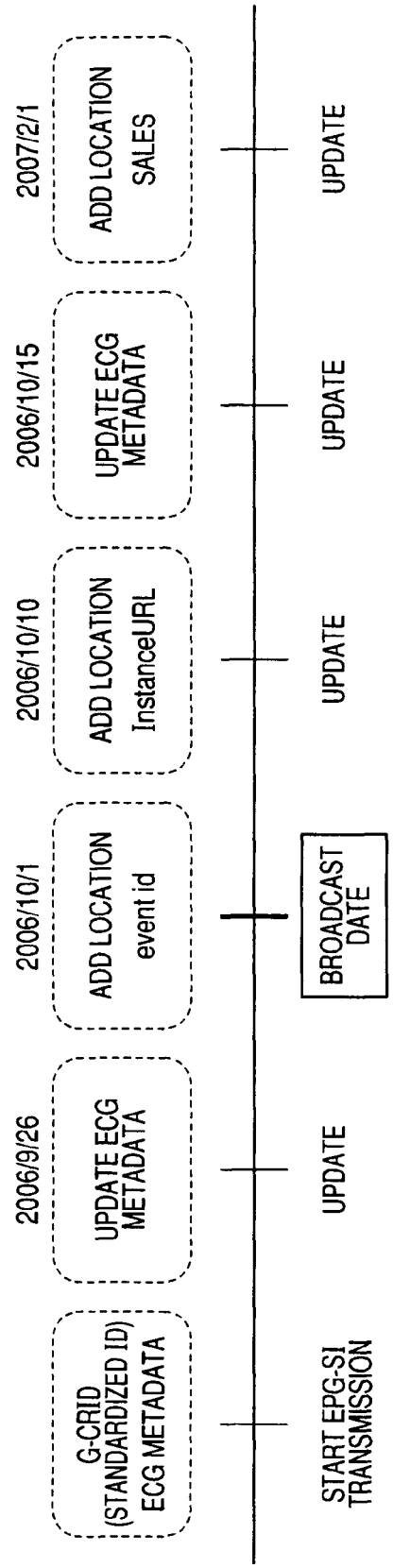
FIG. 13 is a schematic diagram showing an example of addition and update of metadata and location information managed with a G-CRID.

FIG. 13 is a schematic diagram showing an example of addition and update of metadata and location information managed with a G-CRID. FIG. 13 shows a state in which metadata and location information managed with a G-CRID for a specific program are added and updated along a time axis. First, when an electronic program guide is transmitted from the electronic program guide transmission server 1000, metadata is created by the metadata center 1110 and a G-CRID is given to the metadata by the CRID management center 1100. The broadcast receiving terminal 1400 can acquire metadata managed with the G-CRID from the ID resolver 1300.

When the metadata is updated on Sep. 26, 2006, program information in the master CRID database 1310 is updated and program information in the local CRID database 1478 is updated. When a broadcast is performed on Oct. 1, 2006, a location indicating that the broadcast is performed is added and program information managed with a G-CRID is updated. In the electronic program guide using event_ids in the past, update of data after a broadcast date is not performed. However, in the program information according to this embodiment managed with the G-CRID, update of data is performed even after the broadcast date. In other words, when location information (a date and time of re-broadcast, etc.) is added on Oct. 10, 2006, the program information managed with the G-CRID is updated. When metadata is updated on Oct. 15, 2006, the program information managed with the G-CRID is updated. When location information is added on Feb. 1, 2007 and DVDs and the like related to the program are sold, the program information managed with the G-CRID is updated.

Figure 14:
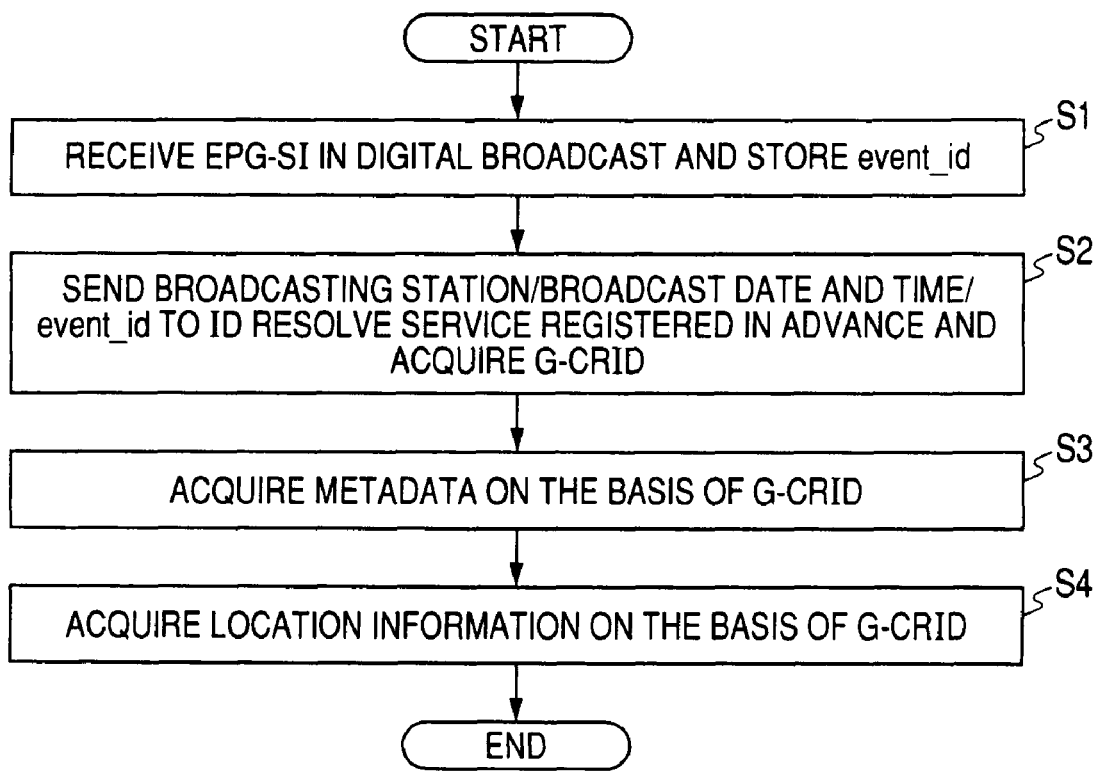
FIG. 14 is a flowchart showing a method of acquiring a G-CRID in the broadcast receiving terminal.

Processing performed in the broadcast receiving terminal 1400 is explained with reference to flowcharts in FIGS. 14 to 18. FIG. 14 is a flowchart showing a method of acquiring a G-CRID in the broadcast receiving terminal 1400. In FIG. 14, first, in step S1, the broadcast receiving terminal 1400 receives an electronic program guide (EPG-SI) in a digital broadcast and stores an event_id. In the next step S2, the broadcast receiving terminal 1400 transmits a broadcasting station, a broadcast date and time, and an event_id of a program to the ID resolver 1300 registered in advance and acquires a G-CRID corresponding to the program from the ID resolver 1300.

In the next step S3, the broadcast receiving terminal 1400 acquires metadata on the basis of the G-CRID. In the next step S4, the broadcast receiving terminal 1400 acquires location information on the basis of the G-CRID. These metadata and location information are stored in the master CRID database 1310 in association with the G-CRID. After step S4, the broadcast receiving terminal 1400 finishes the processing (END).

According to the processing in FIG. 14, it is possible to acquire a G-CRID on the basis of the event-id of the EPG-SI received in the digital broadcast and acquire metadata and location information on the basis of the G-CRID.

Figure 15:
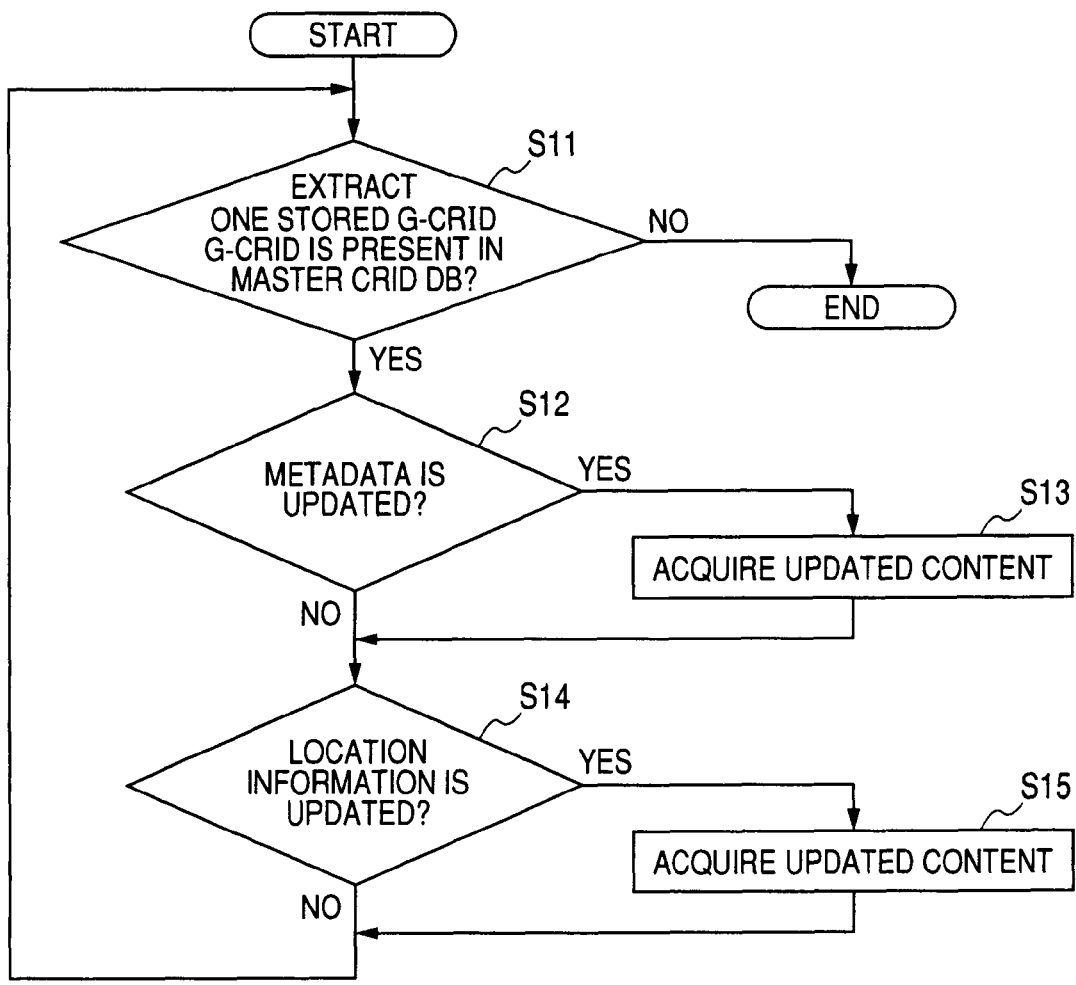
FIG. 15 is a flowchart showing processing for updating metadata and location information stored in the local CRID database in the broadcast receiving terminal.

FIG. 15 is a flowchart showing processing for updating metadata and location information stored in the local CRID database 1478 in the broadcast receiving terminal 1400. First, in step S11, the broadcast receiving terminal 1400 extracts G-CRIDs stored in the local CRID database 1478 one by one and judges whether the extracted G-CRID is present in the master CRID database 1310. When the G-CRID is present in the master CRID database 1310, the broadcast receiving terminal 1400 proceeds to step S12. On the other hand, when the G-CRID is not present in the master CRID database 1310, the broadcast receiving terminal 1400 finishes the processing (END).

In step S12, the broadcast receiving terminal 1400 judges whether metadata of the G-CRID stored in the master CRID database 1310 is updated. When the metadata is updated, the broadcast receiving terminal 1400 proceeds to step S13, acquires content of the update of the metadata from the master CRID database 1310, and reflects the content of the update on metadata of the G-CRID stored in the local CRID database 1478. On the other hand, when the metadata is not updated, the broadcast receiving terminal 1400 proceeds to step S14.

In step S14, the broadcast receiving terminal 1400 judges whether location information of the G-CRID stored in the master CRID database 1310 is updated. When the location information is updated, the broadcast receiving terminal 1400 proceeds to step S15, acquires content of the update of the location information from the master CRID database 1310, and reflects the content on location information of the G-CRID stored in the local CRID database 1478. On the other hand, when the location information is not updated, the broadcast receiving terminal 1400 returns to step S11.

According to the processing in FIG. 15, when the metadata and the location information of the G-CRID stored in the master CRID database 1310 are updated, it is possible to reflect the update on the metadata and the location information of the G-CRID stored in the local CRID database 1478. Therefore, it is possible to typically maintain the metadata and the location information stored in the local CRID database 1748 in a latest state.

Figure 16:
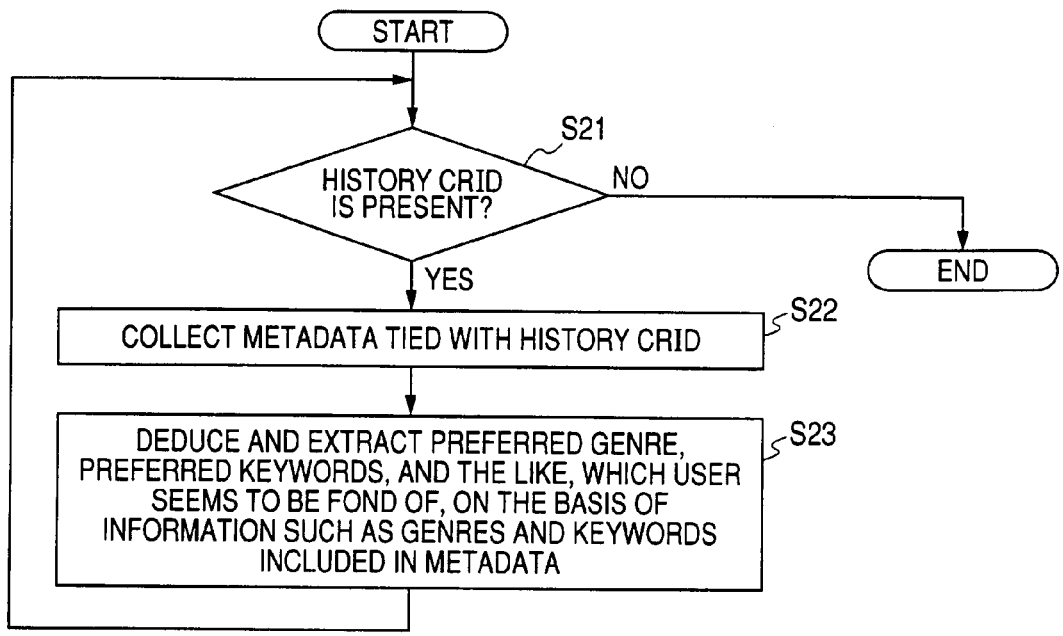
FIG. 16 is a flowchart showing processing for extracting a taste of a user on the basis of a history of use of program information in the broadcast receiving terminal.
Figure 17:
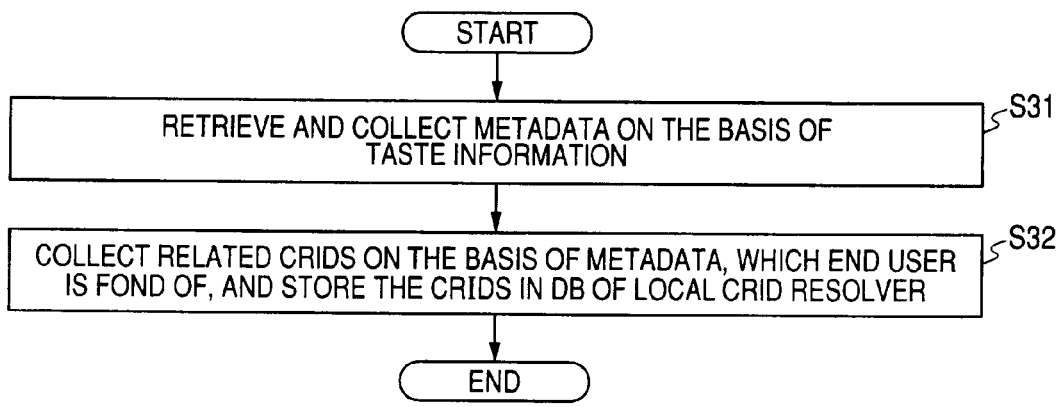
FIG. 17 is a flowchart showing a method of collecting related G-CRIDs on the basis of taste information of the user and storing the G-CRIDs in the local CRID database.

FIGS. 16 and 17 are flowcharts showing a method of accumulating G-CRID in the local CRID database 1478 of the broadcast receiving terminal 1400. FIG. 16 is a flowchart showing processing for extracting a taste of the user on the basis of a history of use of program information in the broadcast receiving terminal 1400. First, in step S21, the broadcast receiving terminal 1400 judges whether a CRID having a history of use (a history CRID) is present. When a history CRID is present, the broadcast receiving terminal 1400 proceeds to step S22. On the other hand, when a history CRID is not present, the broadcast receiving terminal 1400 finishes the processing (END).

In step S22, the broadcast receiving terminal 1400 collects metadata associated with the CRID having the history of use. In the next step S23, the broadcast receiving terminal 1400 deduces a preferred genre, preferred keywords, and the like, which the user seems to fond of, on the basis of information such as genres and keywords included in the metadata and extracts the preferred genre, the preferred keywords, and the like. After step S23, the broadcast receiving terminal 1400 returns to step S21. According to the processing in FIG. 16, it is possible to extract a taste of the user on the basis of the G-CRID having the history of use.

FIG. 17 is a flowchart showing a method of collecting, on the basis of taste information of the user, G-CRIDs related to the taste information and storing the G-CRIDs in the local CRID database 1478.

First, in step S31, the broadcast receiving terminal 1400 retrieves metadata on the basis of taste information of the user and collects the metadata. The taste information is extracted by, for example, the processing in FIG. 16. In the next step S32, the broadcast receiving terminal 1400 collects, on the basis of the metadata extracted in step S31, G-CRIDs related to the metadata and stores the G-CRIDs in the local CRID data base 1478. After step S32, the broadcast receiving terminal 1400 finishes the processing (END).

According to FIGS. 16 and 17, it is possible to store G-CRIDs of programs corresponding to the taste information of the user in the local CRID database 1478 of the broadcast receiving terminal 1400.

Figure 18:
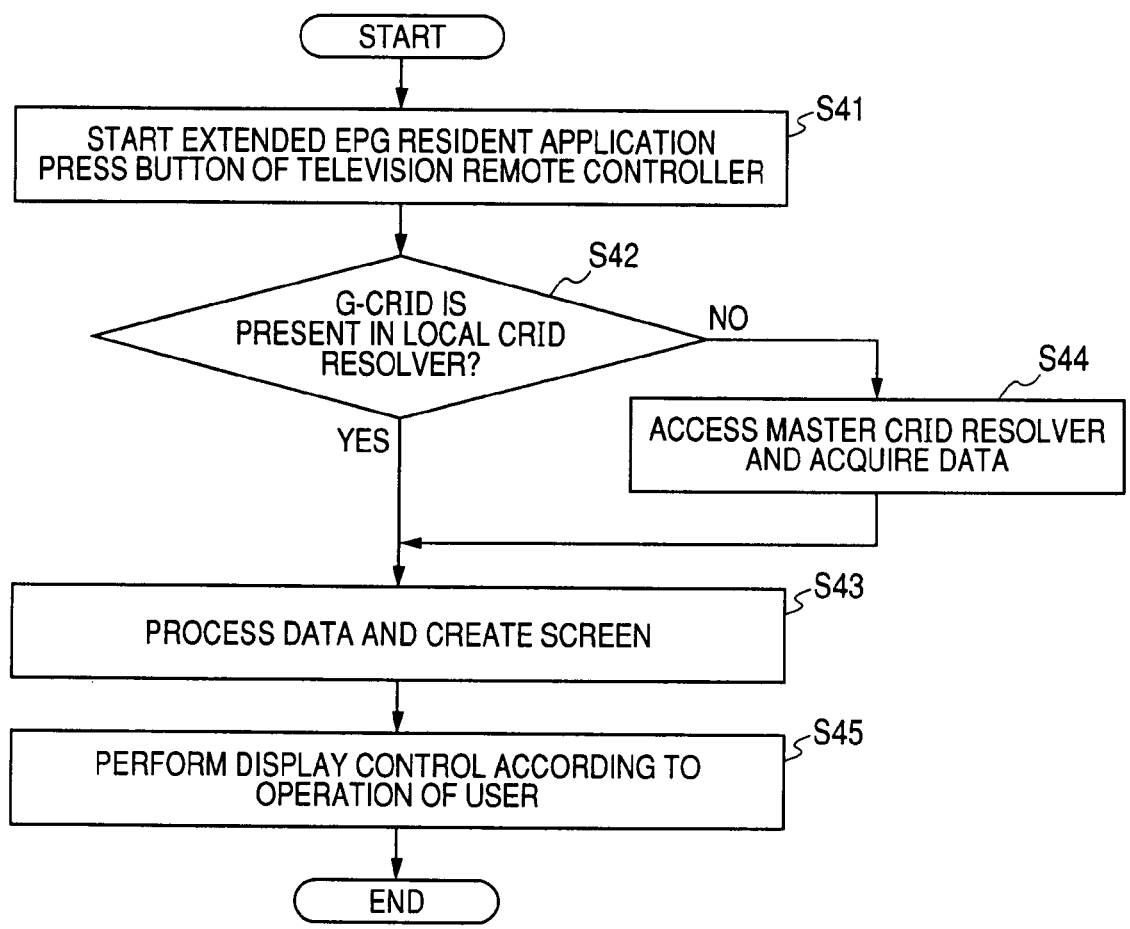
FIG. 18 is a flowchart showing processing during use in the broadcast receiving terminal.

FIG. 18 is a flowchart showing processing during use in the broadcast receiving terminal 1400. First, in step S41, the broadcast receiving terminal 1400 starts the extended-EGP-resident application 1430. In the next step S42, the broadcast receiving terminal 1400 judges whether a G-CRID of a program requested by the user is present in the local CRID database 1478 of the broadcast receiving terminal 1400. When the G-CRID is present in the local CRID database 1478, the broadcast receiving terminal 1400 proceeds to step S43.

On the other hand, when the G-CRID is not present in the local CRID database 1478, the broadcast receiving terminal 1400 proceeds to step S44. In step S44, the broadcast receiving terminal 1400 accesses the master CRID resolver 1310 and acquires data of the G-CRID of the program requested by the user. After step S44, the broadcast receiving terminal 1400 proceeds to step S43.

In step S43, the broadcast receiving terminal 1400 processes the data and creates, on the basis of program information of the G-CRID acquired from the local CRID database 1478 or the master CRID database 1310, a screen on which information such as metadata and location information is displayed.

After step S43, the broadcast receiving terminal 1400 proceeds to step S45. In step S45, the broadcast receiving terminal 1400 performs control of a display screen in the broadcast receiving terminal 1400 according to operation by the user. After step S45, the broadcast receiving terminal 1400 finishes the processing (END).

As described above, in the system according to this embodiment, information on all programs being broadcasted are managed with G-CRIDs separately set in the respective programs. Program information corresponding to a taste of the user is acquired from the master CRID database 1310 and stored in the local CRID database 1478 of the broadcast receiving terminal 1400. When information in the master CRID database 1310 is updated, it is possible to update information in the local CRID database 1478. Therefore, the user can instantaneously acquire latest information on a program matching the state from the local CRID database 1478. When program information requested by the user is not present in the local CRID database 1478, it is also possible to acquire the program information from the master CRID database 1310.

The effect of providing the local CRID database 1478 in the broadcast receiving terminal 1400 and dispersing program information having high frequencies of use in the broadcast receiving terminal 1400 is explained. When program information is retrieved on the basis of a G-CRID, if the program information is stored in the local CRID database 1478 in advance, since location information, metadata, and program related information of the G-CRID are already acquired by the broadcast receiving terminal 1400, it is possible to reduce a processing time. When the retrieval is performed on the master CRID database 1310, a long processing time is necessary in storing a G-CRID of a retrieval result in the broadcast receiving terminal 1400. When accesses from the large number of broadcast receiving terminals 1400 to the ID resolver 1300 concentrate, a long processing time is necessary in an inquiry from the broadcast receiving terminal 1400 as a client.

Concerning processing speed, when a simulation is performed under predetermined conditions, improvement of the processing speed by about ten folds is expected as described below. For example, when a data size of a first program is 500 KB/program and the number of programs necessary to be acquired in one retrieval is 100, a data size of 100 programs is 100×500 KB=50 MB. Speed in retrieving data from the local CRID database 1478 is about 10 Gbyte/sec. On the other hand, speed in retrieving data from the master CRID database 1310 anew is 10 Mbps=1 MB/sec because the retrieval is performed through the network.

In extracting a G-CRID, when a hit ratio of data in the local CRID database 1478 is 0%, the broadcast receiving terminal 100 accesses the master CRID database 1310. Time for acquiring data of a program from the master CRID database 1310 is about 50 seconds according to the following equation.

50 MB*1.0/1 MB+50 MB*0/10000 MB=50 [seconds]

On the other hand, when a hit ratio of data in the local CRID database 1478 is 90%, only the data of remaining 10% has to be acquired from the master CRID database 1310. In this case, acquisition of data for 100 programs is finished in about 5 seconds according to the following equation.

50 MB*0.1/1 MB+50 MB*0.9/10000 MB=5+ 0.045=5.045 [seconds]

Therefore, improvement in processing speed of about ten folds is expected.

Figure 19:
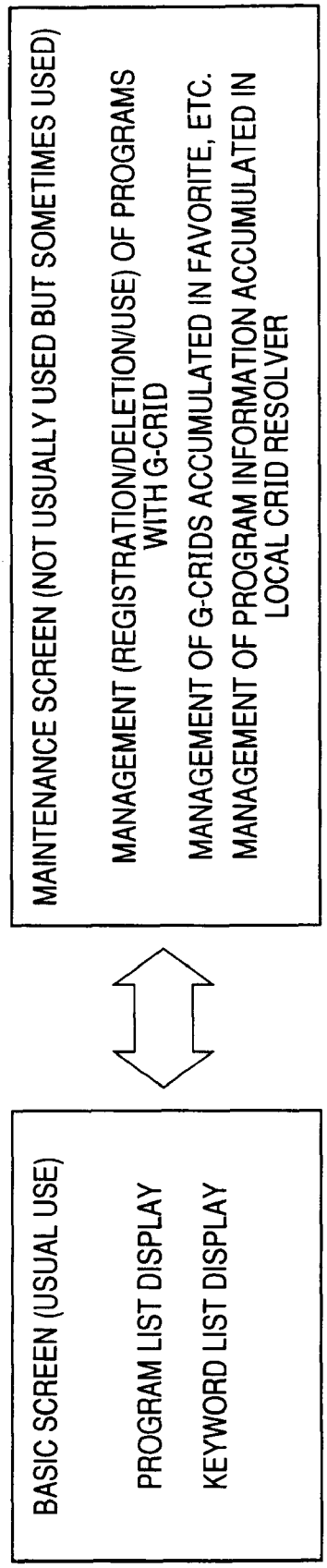
FIG. 19 is a schematic diagram showing a type of a screen displayed on a displaying/reproducing unit of the broadcast receiving terminal.

A function of the broadcast receiving terminal 1400 with which the user operates program information is explained. FIG. 19 is a schematic diagram showing a type of a screen displayed on the displaying/reproducing unit 1440 of the broadcast receiving terminal 1400. Display of program information on the displaying/reproducing unit 1440 is controlled by the GUI unit 1432 of the extended-EPG resident application unit 1430.

As shown in FIG. 19, in this embodiment, it is possible to switch and display a basic screen that the user usually uses and a maintenance screen. On the basic screen, a program guide is displayed and a list of keywords is displayed.

On the other hand, on the maintenance screen, it is possible to perform management (registration/deletion/use) of a program with a G-CRID, management of a G-CRID added in favorite and the like, management of the program information accumulated in the local CRID database 1478 explained with reference to FIG. 12, and the like.

Figure 20:
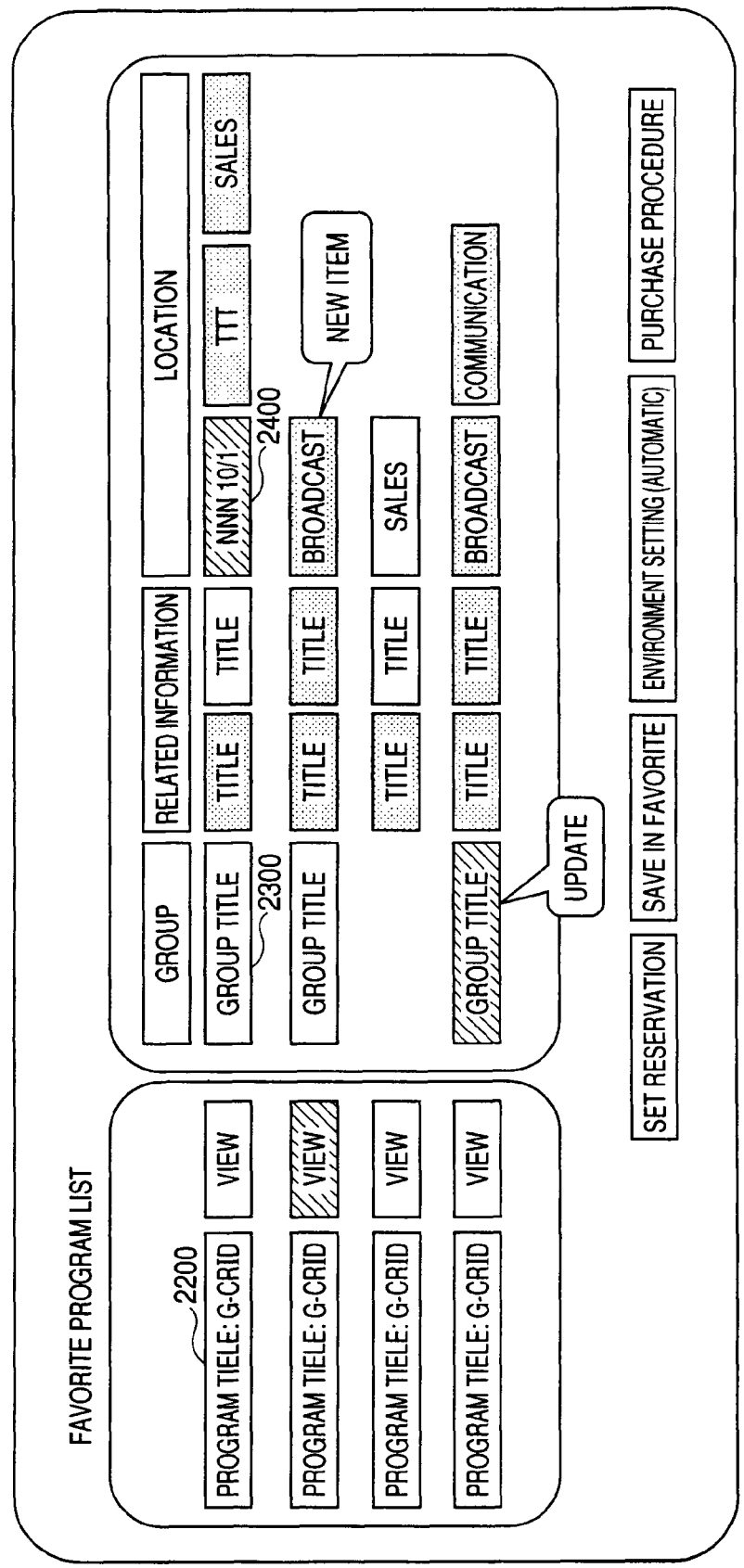
FIG. 20 is a schematic diagram showing an example of a basic screen of the broadcast receiving terminal.

FIG. 20 is a schematic diagram showing an example of the basic screen. On the basic screen shown in FIG. 20, a list of favorite programs is displayed on the left side of the screen. Concerning the respective programs, G-CRIDs are displayed together with program titles. When the user clicks an icon of "view", information (metadata and location information) concerning a program indicated by the clicked icon is displayed.

As shown in FIG. 20, a group of a program, related information, and location information are displayed on the right side of the basic screen. In a space of "group", a title of a group to which the group belongs is displayed. When the user clicks the space, information on other programs belonging to the group is displayed. For example, in the screen in FIG. 20, in the case in which a program 2200 represented by a G-CRID located at the top is a movie, when the user clicks a space of a group title 2300, information on other movies of a group to which the movie belongs is displayed. Information belonging to the "group" is managed with the Group GRID described above.

In a space of "related information", information on a product put on sale in relation to the program is displayed. For example, in the case in which a DVD of the program is put on sale, when the user clicks "title" of the space "related information", information on the DVD is displayed.

In a space of "location", location information of the program is displayed. Location information such as a broadcast date and time and time is displayed in this space in detail. When it is determined that the program is re-broadcasted, a date and time of the re-broadcast is displayed here.

Among the spaces shown in FIG. 20, halftone dots are applied to spaces corresponding to information added anew in the master CRID database 1478. Hatching is applied to spaces corresponding to information updated in the master CRID database 1478. For example, information on the group title 2300 applied with the halftone dots in the space of "group" indicates information that was not present when the user accessed this screen last time and added in the master CRID database 1478 anew. A space 2400 applied with the hatching in the space of "location" is information that was displayed when the user accessed the screen last time and updated in the master CRID database 1310. When the user clicks these spaces and displays the information, the dots or the hatching is removed.

Therefore, the display screen shown in FIG. 20 changes everyday according to addition and update of items. Therefore, the user can typically acquire latest information on programs by clicking spaces applied with dots or hatching. In FIG. 20, added information and updated information are indicated by the dots and the hatching. However, the added information and the updated information may be indicated by changing display colors of the respective columns.

Figure 21:
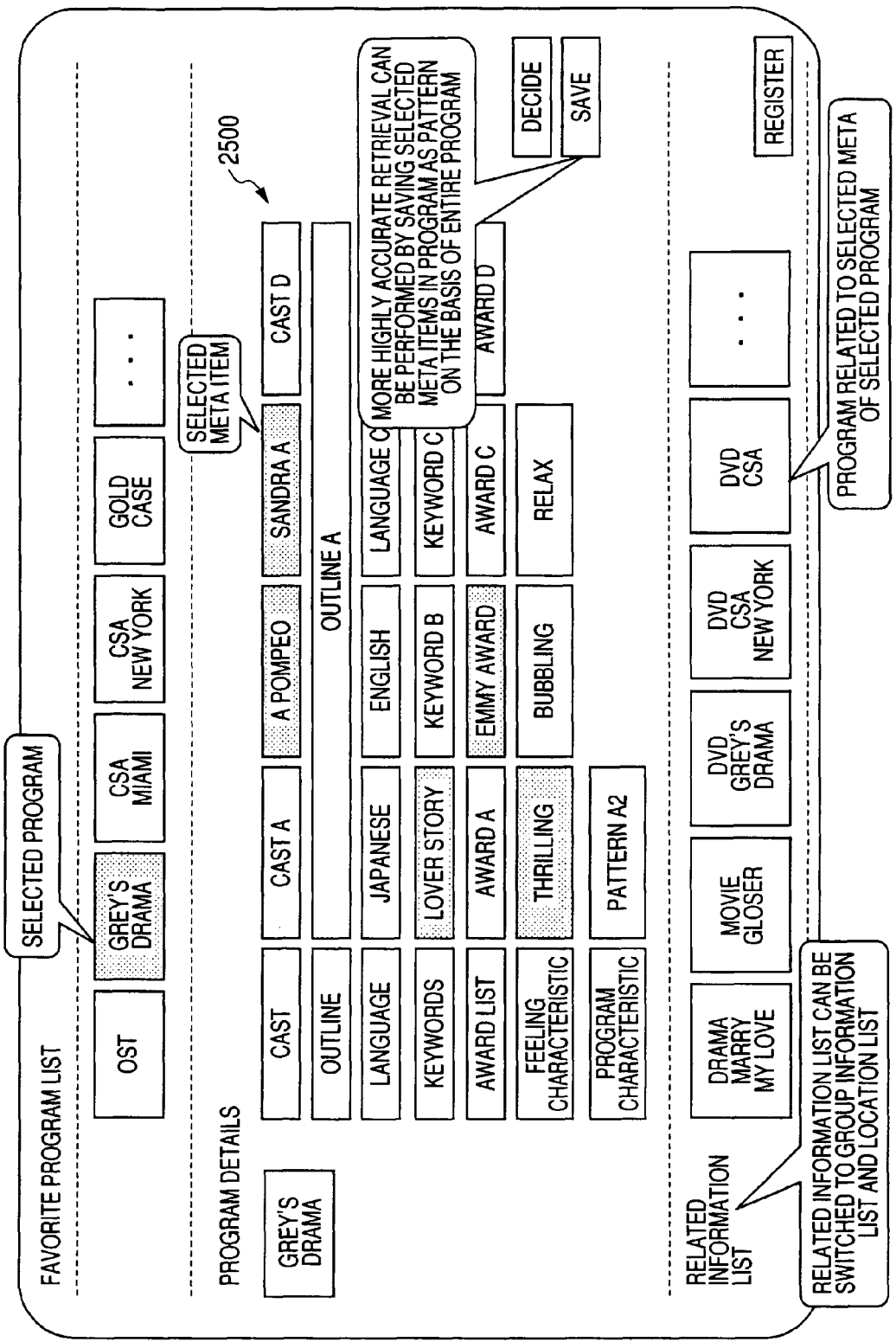
FIG. 21 is a schematic diagram showing an example in which one program is selected from a favorite program list and detailed information concerning the selected program is displayed.

FIG. 21 shows an example in which one program is selected from a list of favorite programs and detailed information concerning the selected program is displayed. As shown in FIG. 21, the favorite programs are displayed in a row in an upper part of a screen. FIG. 21 shows a state in which "Grey's drama" is selected out of the favorite programs.

When "Grey's drama" is selected, in a space of program details, information such as a cast, an outline such as a story, a language, keywords, an award list, a feeling characteristic, and a program characteristic (meta items 2500) is displayed as a list. Therefore, by selecting a program out of the favorite programs, the user can acquire various kinds of information on the selected program.

In the information on program details shown in FIG. 21, when the user clicks the respective spaces of the meta items 2500, dots are applied to the meta items 2500, whereby items that the user particularly likes and items that the user pays attention are specified. The user can decide and save meta items applied with the dots by clicking spaces "decide" and "save".

By specifying the favorite meta items 2500, when program information (G-CRID) is retrieved next time, it is possible to retrieve the program information with information further narrowed down on the basis of the meta item 2500 applied with the dots. Therefore, by saving the selected meta items 2500 in a program as a pattern on the basis of the entire program, it is possible to further improve accuracy of retrieval from the local CRID database 1478 or the master CRID database 1310. Consequently, it is possible to acquire information taking into account the selected meta items 2500, improve accuracy in acquiring program information, and extract program information that better suits a preference of the user. The user can save the selected meta items 2500 by clicking the icons of "decide" and "save".

In a lower space in FIG. 21, the "related information" shown on the right side of FIG. 20 is displayed. Information displayed in this space can be switched to the list of group information and the list of location information displayed on the right side of FIG. 20.

Therefore, according to the screen in FIG. 21, the user can designate more detailed meta items, designate favorite items concerning a favorite program, and keep the items in a form for reuse. Therefore, it is possible to keep taste information of the program in a form intended by the user.

Figure 22:
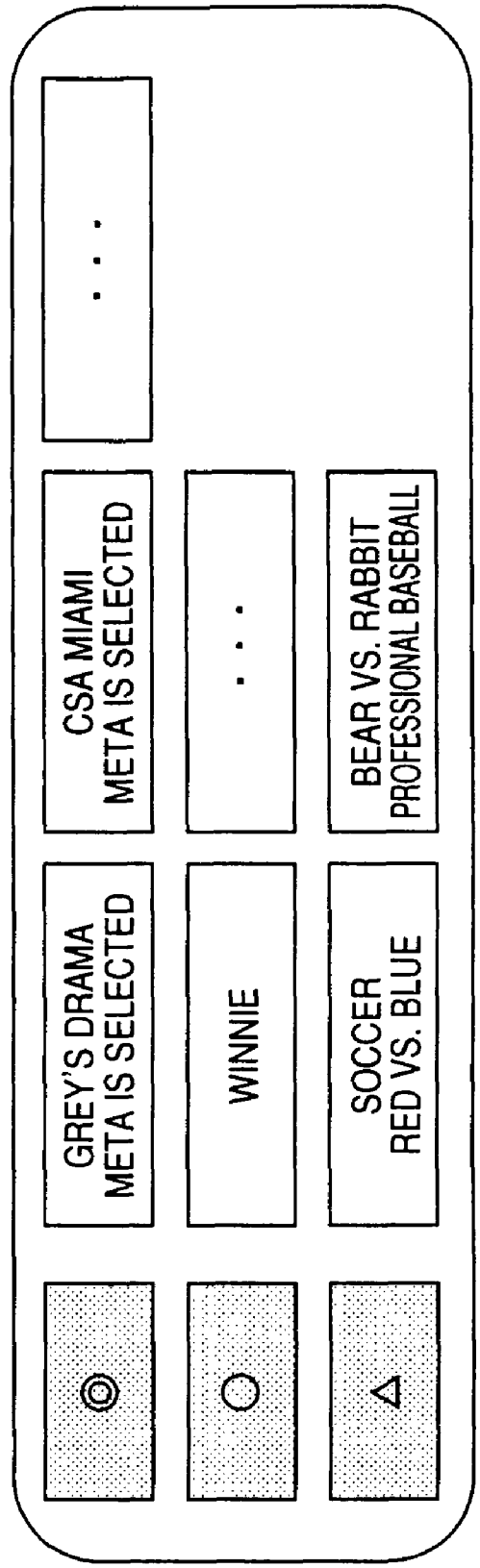
FIG. 22 is a schematic diagram showing a screen in which a favorite level is set.

FIG. 22 is a schematic diagram showing a screen for setting a favorite level. The favorite level is classified into, for example, three stages of A: excellent, B: fair, and C: view when not busy. The user can classify the favorite level into the three, A, B, and C on the screen in FIG. 22. Consequently, the broadcast receiving terminal 1400 can extract a G-CRID according to the favorite level. A favorite level can also be set for the meta items 2500 explained with reference to FIG. 21.

Figure 23:
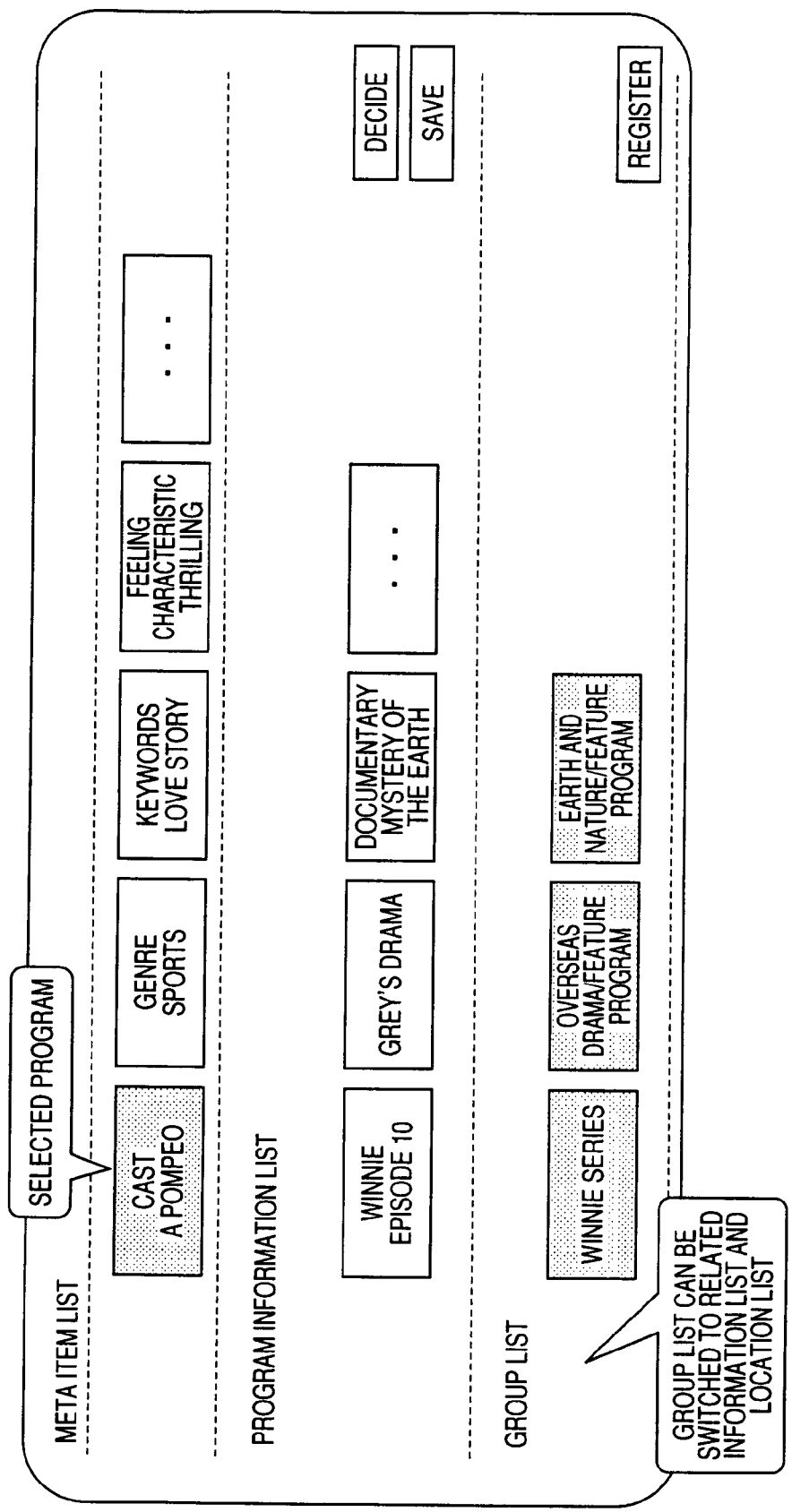
FIG. 23 is a schematic diagram showing a screen on which various kinds of information are displayed on the basis of meta items shown in FIG. 21.

FIG. 23 is a schematic diagram showing a screen for displaying various kinds of information on the basis of the meta items 2500 shown in FIG. 21. In an example in FIG. 23, among program information, the meta items 2500 related to a cast, keywords, and the like are set. When the user selects the meta items 2500, it is possible to display a title of a program related to the meta items 2500.

Figure 24:
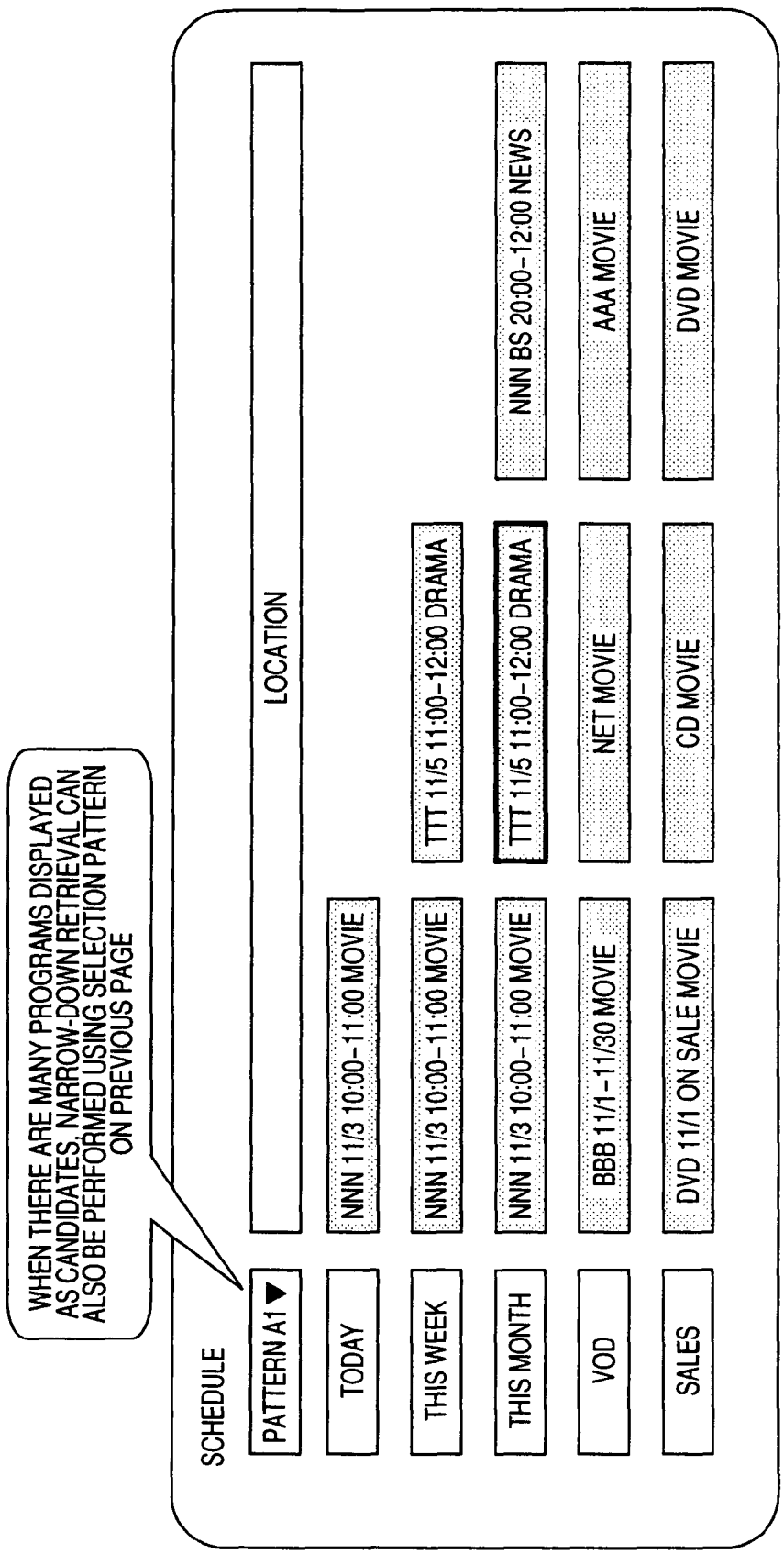
FIG. 24 is a schematic diagram showing a schedule table of programs that the user refers to everyday.

FIG. 24 is a schematic diagram showing a schedule table of programs that the user refers to everyday. An example in which the respective programs are displayed for each piece of location information is shown. Besides the location information, the respective programs may be displayed for each piece of group information and each piece of product sales information.

In FIG. 24, a "pattern A1" represents the favorite level and corresponds to A in FIG. 22. Therefore, in FIG. 24, programs that the user desires to watch most is preferentially displayed. When the number of programs retrieved with the "pattern A1" is small, a "pattern A2" corresponding to B in FIG. 22 or a "pattern A3" corresponding to C in FIG. 22 is selected such that programs are retrieved in a wider range. Consequently, it is possible to increase the number of retrieved programs and the user can select programs, information on which is desired, out of the programs.

Figure 25:
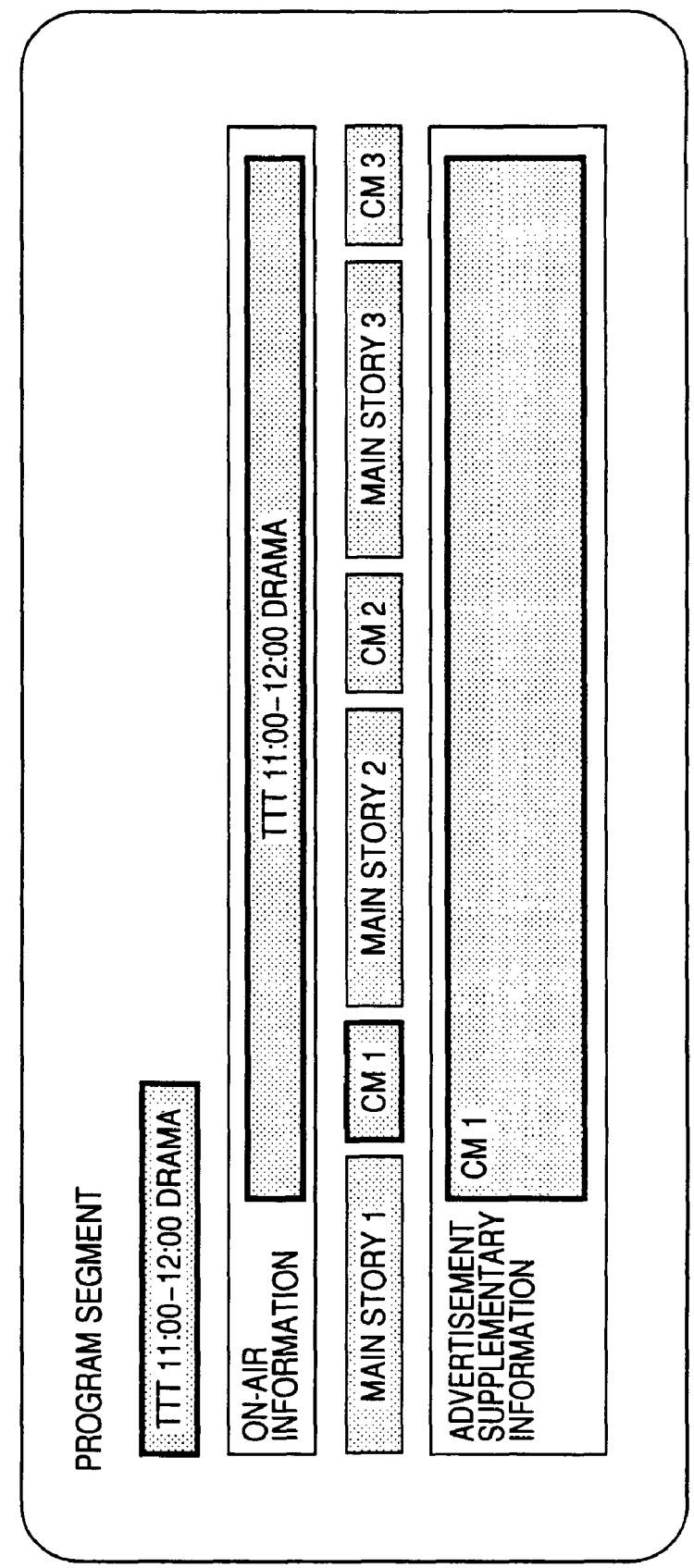
FIG. 25 is a schematic diagram showing an example in which details of program content are displayed.

FIG. 25 is a schematic diagram showing an example in which details of program content are displayed. As program information, besides information on a main story, it is also possible to display information on a time frame of a CM and a cast of the CM.

A screen of the broadcast receiving terminal 1400 and functions of the screen are explained below. FIG. 26 is a schematic diagram showing another example of the basic screen. A program page corresponding to a preference of the user is shown in the figure. On the basic screen in FIG. 26, concerning respective genres such as "sports", "hot spring", and "cartoon", information on programs matching a taste of the user is displayed in respective time frames of morning, day time, and night.

The respective genres such as "sports", "hot spring", and "cartoon" are registered by the user in advance. These genres can be automatically set on the basis of taste information. Concerning the respective genres, the broadcast receiving terminal 1400 extracts G-CRIDs of programs matching taste information of the user from the local CRID database 1478 or the master CRID database 1310 and displays program information (metadata and location information) on the basic screen.

In a space of "favorite", favorite programs registered by the user in advance are displayed in the respective time frames of morning, day time, and night. For example, when the user designates programs such as dramas broadcasted every week in "favorite", information on programs broadcasted today among the programs designated in the favorite is displayed.

In a space of "recommendation", information on programs acquired from the local CRID database 1478 or the master CRID database 1310 is displayed according to the taste information of the user. The information on the programs displayed here is information on the programs broadcasted today among the programs accumulated by the method explained with reference to FIG. 8. Therefore, by selecting programs from the space of "recommendation", the user does not need to find programs matching a preference of the user out of an enormous number of programs and can instantaneously select programs matching the preference.

As shown in FIG. 26, in spaces representing information on respective programs, icons, "X", "Y", and "Z" are arranged. The user can add the respective programs in the favorite, refer to information on other programs in a group to which a program belongs, and acquire information on products related to the program on the basis of these icons.

For example, when the user clicks the icon "X", the user can add a program indicated by the clicked icon "X" to the favorite. When the user clicks the icon "Y", the user can refer to information on other programs in a group to which a program indicated by the clicked icon "Y" belongs. For example, when the program is baseball, the user can refer to information on other programs in a group to which baseball belongs.

When the user clicks the icon "Z", the user can acquire information on products related to a program indicated by the clicked icon "Z". For example, when the program is a drama and DVDs of broadcasts of the drama in the past are sold, the user can obtain sales information of the related goods by clicking the icon "Z".

The embodiments of the present invention have been explained with reference to the accompanying drawings. However, it goes without saying that the present invention is not limited to such examples.

It should be understood by those skilled in the art that various modifications, combinations, sub-combinations, and alterations may occur depending on design requirements and other factors insofar as they are within the scope of the appended claims or the equivalents thereof.

What is claimed is:

1. A program information retrieval system in which a broadcast receiving terminal that receives a broadcast program and a resolver server that provides program information attached with an identifier peculiar to each broadcast program are connected through a communication network, the broadcast receiving terminal comprising:
a local storing unit that stores the program information;
a taste-information acquiring unit that acquires taste information of a user;
a program-information requesting unit that requests, on the basis of the taste information, the resolver server to provide program information;
a program-information receiving unit that receives the program information transmitted from the resolver server; and
a program-information updating unit that continuously updates the program information on a plurality of dates after the broadcast program has concluded,
wherein the resolver server includes
a master storing unit that stores the program information,
a program-information-request receiving unit that receives a request for program information based on the taste information from the broadcast receiving terminal,
a program-information extracting unit that extracts program information matching the taste information from the master storing unit using the identifier, and
a transmitting unit that transmits the program information extracted from the master storing unit to the broadcast receiving terminal.

2. A program information retrieval system according to claim 1, further comprising a program-information creating apparatus that gives the identifier by associating broadcasting station information, broadcast date and time information, and metadata information of the broadcast program with the identifier and creates the program information, wherein
the resolver server receives the program information from the program-information creating apparatus.

3. A broadcast receiving terminal connected to a resolver server that provides program information attached with an identifier peculiar to each broadcast program, the broadcast receiving terminal comprising:
a storing unit that stores the program information transmitted from the resolver server;
a taste-information acquiring unit that acquires taste information of a user;
a program-information-extraction requesting unit that requests, on the basis of the taste information, the resolver server to extract program information;
a program-information receiving unit that receives the program information transmitted from the resolver server;
a program-information updating unit that continuously updates the program information on a plurality of dates after the broadcast program has concluded.

4. A broadcast receiving apparatus according to claim 3, wherein the taste-information acquiring unit acquires the taste information on the basis of a history of use of the program information.

5. A broadcast receiving apparatus according to claim 3, further comprising a program-information erasing unit that erases program information stored in the storing unit according to a state of access to the program information.

6. A broadcast receiving apparatus according to claim 3, further comprising an environment-condition setting unit that sets, in a period until a program is broadcasted, predetermined environment conditions including an object medium, keywords of the program, a genre of the program, a cast of the program, and priority orders in the case of extraction, wherein
the program-information-extraction requesting unit requests, on the basis of the environment information, the resolver server to extract program information.

7. A broadcast receiving apparatus according to claim 3, wherein the program-information updating unit updates, when specific program information held by the resolver server is updated, program information stored in the storing unit corresponding to the specific program information.

8. A broadcast receiving apparatus according to claim 3, further comprising a display unit that displays the program information, wherein
the display unit displays program information of plural broadcasting stations classified on the basis of the identifier on one screen.

9. A broadcast receiving apparatus according to claim 8, wherein, when the program information held by the resolver server is updated, a display state of an item related to the update among the program information displayed on the display unit is changed.

10. A broadcast receiving apparatus according to claim 8, further comprising a selecting unit that is capable of selecting plural items related to the program information displayed on the display unit, wherein
the taste-information acquiring unit acquires taste information of the user on the basis of the selected items.

11. A broadcast receiving apparatus according to claim 3, wherein the program-information-extraction requesting unit requests, when program information requested by the user is not present in the storing unit, the resolver server to extract the program information.

12. A program information retrieval apparatus comprising:
a storing unit that stores program information attached with an identifier peculiar to each broadcast program;
a program-information-request receiving unit that receives a request for program information based on taste information of a user from a broadcast receiving terminal;
a program-information extracting unit that extracts program information matching the taste information from the storing unit using the identifier; and
a transmitting unit that transmits the program information extracted from the storing unit to the broadcast receiving terminal,
wherein the program information is continuously updated on a plurality of dates after the broadcast program has concluded.

13. A program information retrieval apparatus according to claim 12, wherein the program-information extracting unit extracts, in a period until a program transmitted from the broadcast receiving terminal is broadcasted, program information matching the taste information on the basis of predetermined environment conditions including an object medium, keywords of the program, a genre of the program, a cast of the program, and priority orders in the case of extraction.

14. A program information retrieval apparatus according to claim 12, wherein the program information retrieval apparatus gives the identifier by associating metadata and location information of the broadcast program and is connected to a program information creating apparatus that creates the program information to receive the program information from the program information creating apparatus.

15. A program information retrieval apparatus according to claim 12, wherein, when the program information held by the storing unit is updated, the transmitting unit transmits information related to the update to the broadcast receiving terminal.

16. A program information retrieval method used in a program information retrieval system in which a broadcast receiving terminal that receives a broadcast program and a resolver server that provides program information attached with an identifier peculiar to each broadcast program are connected through a communication network, the program information retrieval method comprising the steps of:
   acquiring taste information of a user;
   requesting, on the basis of the taste information, from the broadcast receiving terminal, the resolver server to provide program information;
   extracting program information matching the taste information from a master storing unit included in the resolver server using the identifier;
   transmitting the extracted program information from the resolver server to the broadcast receiving terminal and storing the program information in a local storing unit of the broadcast receiving terminal; and
   continuously updating the program information on a plurality of dates after the broadcast program has concluded.

17. A non-transitory computer-readable storage medium having computer executable instructions recorded thereon, wherein the instructions, when executed by a computer, cause the computer to perform a method, the method comprising:
   receiving program information attached with an identifier peculiar to each broadcast program from a resolver server that provides program information;
   storing the program information; acquiring taste information of a user;
   requesting, on the basis of the taste information, the resolver server to extract the program information; and
   continuously updating the program information on a plurality of dates after the broadcast program has concluded.

18. A non-transitory computer-readable storage medium having computer executable instructions recorded thereon, wherein the instructions, when executed by a computer, cause the computer to perform a method, the method comprising:
   storing program information attached with an identifier peculiar to each broadcast program;
   receiving a request for program information based on taste information of a user from a broadcast receiving terminal;
   extracting program information matching the taste information from the storing unit using the identifier;
   transmitting the program information extracted from the storing unit to the broadcast receiving terminal; and
   continuously updating the program information on a plurality of dates after the broadcast program has concluded.

19. A broadcast receiving terminal connected to a resolver server that provides program information attached with an identifier peculiar to each broadcast program, the broadcast receiving terminal comprising:
   a storing means for storing the program information transmitted from the resolver server;
   a taste-information acquiring means for acquiring taste information of a user;
   a program-information-extraction requesting means for requesting, on the basis of the taste information, the resolver server to extract program information;
   a program-information receiving means for receiving the program information transmitted from the resolver server; and
   a program-information updating means for continuously updating the program information on a plurality of dates after the broadcast program has concluded.

20. A program information retrieval apparatus comprising:
   a storing means for storing program information attached with an identifier peculiar to each broadcast program;
   a program-information-request receiving means for receiving a request for program information based on taste information of a user from a broadcast receiving terminal;
   a program-information extracting means for extracting program information matching the taste information from the storing unit using the identifier; and
   a transmitting means for transmitting the program information extracted from the storing unit to the broadcast receiving terminal,
   wherein the program information is continuously updated on a plurality of dates after the broadcast program has concluded.

* * * * *